United States Patent
Johnson et al.

(10) Patent No.: US 12,457,999 B2
(45) Date of Patent: Nov. 4, 2025

(54) POULTRY CRADLE UNLOADING SYSTEMS AND METHODS

(71) Applicant: NOVA-TECH ENGINEERING, LLC, Willmar, MN (US)

(72) Inventors: Scott C. Johnson, Blomkest, MN (US); Nathan A. Blum, Cosmos, MN (US)

(73) Assignee: Nova-Tech Engineering, LLC, Willmar, MN (US)

( * ) Notice: Subject to any disclaimer, the term of this patent is extended or adjusted under 35 U.S.C. 154(b) by 0 days.

(21) Appl. No.: 18/701,387

(22) PCT Filed: Apr. 27, 2022

(86) PCT No.: PCT/US2022/026473
§ 371 (c)(1),
(2) Date: Apr. 15, 2024

(87) PCT Pub. No.: WO2023/075843
PCT Pub. Date: May 4, 2023

(65) Prior Publication Data
US 2024/0415091 A1     Dec. 19, 2024

Related U.S. Application Data

(60) Provisional application No. 63/273,465, filed on Oct. 29, 2021.

(51) Int. Cl.
*A01K 45/00*     (2006.01)
(52) U.S. Cl.
CPC .................................. *A01K 45/005* (2013.01)
(58) Field of Classification Search
CPC ...... A01K 37/00; A01K 45/00; A01K 45/005; A22B 7/003; A22B 7/001
(Continued)

(56) References Cited

U.S. PATENT DOCUMENTS 3,568,643 A * 3/1971 Wessinger ........... A01K 45/005
                                                    43/6.5
3,774,578 A * 11/1973 Randolph .............. A61D 1/025
                                                    119/714
(Continued)

FOREIGN PATENT DOCUMENTS

CN     209595956 U  * 11/2019  ............. A61D 1/025
EP       0 145 077        6/1985
(Continued)

OTHER PUBLICATIONS

PCT International Search Report and Written Opinion for PCT/US2022/026473 dated Sep. 2, 2022 (19 pages).

*Primary Examiner* — Joshua D Huson
*Assistant Examiner* — Brook Victoria Schmid
(74) *Attorney, Agent, or Firm* — Mueting Raasch Group

(57) ABSTRACT

The poultry cradle unloading systems and methods described herein provide for the unloading of birds and, in some cases, placement of the birds in a selected location among two or more possible selected locations. The unloading may be accomplished in a manner that promotes safety for the birds by releasing the birds such that they are predisposed to landing in an upright orientation after release from a cradle. The unloading may involve releasing the head before releasing the legs of the bird. The cradle and/or bird retained in the cradle may be oriented such that the bird is held at an angle such that the head of the bird is located forward of the hock joints.

17 Claims, 22 Drawing Sheets

(58) Field of Classification Search
USPC .......................................... 452/53; 119/843
See application file for complete search history.

(56) References Cited

U.S. PATENT DOCUMENTS

| | | | |
|---|---|---|---|
| 8,632,379 B2 | 1/2014 | Van Den Nieuwelaar | |
| 9,775,695 B2 | 10/2017 | Erickson | |
| 9,808,328 B2 * | 11/2017 | Gorans | A61D 1/005 |
| 2013/0108120 A1 * | 5/2013 | Van De Loo | A01K 29/00 |
| | | | 382/110 |
| 2015/0148771 A1 * | 5/2015 | Samson | A61D 1/025 |
| | | | 604/131 |

FOREIGN PATENT DOCUMENTS

| | | | | |
|---|---|---|---|---|
| NL | 9201061 A | * | 1/1994 | A01K 45/005 |
| NL | 1018787 C2 | * | 2/2003 | A61D 11/00 |
| WO | WO-2017125387 A1 | * | 7/2017 | A61D 1/025 |
| WO | WO-2021205312 A1 | * | 10/2021 | A61D 7/00 |

* cited by examiner

POULTRY CRADLE UNLOADING SYSTEMS AND METHODS

RELATED APPLICATION

The application is a § 371 U.S. National Stage of International Application No. PCT/US2022/026473 filed 27 Apr. 2022, which claims the benefit under 35 U.S.C. § 119 of U.S. Provisional Application Ser. No. 63/273,465, filed 29 Oct. 2021, and titled POULTRY CRADLE UNLOADING SYSTEMS AND METHODS, both of which are incorporated herein by reference in their entireties.

FIELD

Poultry cradle unloading systems and methods are described herein.

BACKGROUND

Poultry processed in systems in which the birds are restrained in carriers or cradles must be released after any desired processes have been performed. Release of the birds can be problematic when, for example, both the heads and the legs of the bird are restrained.

SUMMARY

The poultry cradle unloading systems and methods described herein provide, in one or more embodiments, for the unloading of birds and, optionally, placement of the birds in a selected location among two or more possible selected locations.

The unloading may be accomplished in a manner that promotes safety for the birds by releasing the birds such that they are predisposed to landing in an upright orientation after release from a cradle. In one or more embodiments, the unloading may involve releasing the head before releasing the legs of the bird. In one or more embodiments, the cradle and/or bird retained in the cradle may be oriented such that the bird is held at an angle such that the head of the bird is located forward of the hock joints (relative to a vertical axis defined by the direction of gravity).

One or more embodiments of the poultry cradle unloading systems and methods described herein may also be configured to place birds in one or more selected locations after unloading. Placement of birds in a selected location may be useful when the birds are processed differently (e.g., different birds may undergo a different set of processes such as beak treatment, claw treatment, injection, etc.) and birds receiving different sets of processes may need to be separated from each other.

Other reasons for placing different birds in different selected locations after unloading may include, e.g., selectively placing birds based on one or more physical characteristics (such as, e.g., weight, etc.), species (where different species are being processed at the same time), gender, etc.

In addition to or in place of the other reasons for selectively placing unloaded birds in selected locations, birds being unloaded may be placed in different selected locations based on counts. In other words, it may be desirable that a selected number of birds be placed in selected containers as they are unloaded to, for example, avoid overcrowding in a selected container, etc.

Although the poultry cradle unloading systems and methods described herein may be used with birds of any age, they may be particularly useful when used with hatchlings, where "hatchlings" are defined as young birds (e.g., chickens, turkeys, ducks, geese, etc.) with an age of one week or less.

In a first aspect, one or more embodiments of a poultry cradle unloading system as described herein include: a plurality of poultry cradles, wherein each poultry cradle of the plurality of poultry cradles comprises a head restraint configured to retain a head of a bird retained in the poultry cradle when the head restraint is in a closed configuration and a leg restraint configured to retain legs of a bird retained in the poultry cradle when the leg restraint is in a closed configuration; a poultry cradle transport apparatus configured to move each poultry cradle of a plurality of poultry cradles to an unload location; a head release apparatus configured to move between a home position and a release position, wherein the head release apparatus is configured to move the head restraint of a poultry cradle in the unload location from the closed configuration to a release configuration in which the head of a bird retained in the poultry cradle is no longer retained by the head restraint when the head release apparatus moves from the home position to the release position; a leg release apparatus configured to move between a home position and a release position, wherein the leg release apparatus is configured to move the leg restraint of a poultry cradle in the unload location from the closed configuration to an open configuration in which the legs of a bird retained in the poultry cradle are no longer retained by the leg restraint when the leg release apparatus moves from the home position to the release position; and a controller operably connected to a head release actuator and a leg release actuator, wherein the controller is configured to: operate the head release actuator to move the head release apparatus from the home position to the release position such that the head restraint of a poultry cradle in the unload location is moved from the closed configuration to the release configuration in which the head of a bird retained in the poultry cradle is no longer retained by the head restraint; and operate the leg release actuator to move the leg release apparatus from the home position to the release position such that the leg restraint of a poultry cradle in the unload location is moved from the closed configuration to the open configuration in which the legs of a bird retained in the poultry cradle are no longer retained by the leg restraint.

In one or more embodiments of the poultry cradle unloading systems described herein, the controller is configured to operate the head release actuator before operating the leg release actuator.

In one or more embodiments of the poultry cradle unloading systems described herein, the controller is configured to operate the head release actuator and the leg restraint actuator such that the head restraint is in the release configuration when the leg restraint is moving from the closed configuration to the open configuration. In one or more embodiments, the head restraint is in the release configuration when the leg restraint is in the open configuration.

In one or more embodiments of the poultry cradle unloading systems described herein, the controller is configured to operate the head release actuator to move the head release apparatus back to the home position from the release position after operating the head release actuator to move the head release apparatus from the home position to the release position.

In one or more embodiments of the poultry cradle unloading systems described herein, the leg release apparatus comprises a dampened contact assembly configured to contact the leg restraint of a poultry cradle located in the unload location when leg release apparatus is moving into the open configuration.

In one or more embodiments of the poultry cradle unloading systems described herein, each poultry cradle, when in the unload location, is canted such that a ventral surface of a bird restrained in a poultry cradle at the unload location faces downward.

In one or more embodiments of the poultry cradle unloading systems described herein, each poultry cradle, when in the unload location, is canted such that a first vertical axis defined by gravity extending through the head of a bird restrained in a poultry cradle at the unload location is offset in a horizontal direction from a second vertical axis defined by gravity extending between the hock joints of a bird restrained in a poultry cradle. In one or more embodiments, a majority of a torso of a bird restrained in a poultry cradle at the unload location is located between the first vertical axis and the second vertical axis.

In one or more embodiments of the poultry cradle unloading systems described herein, a head of a bird restrained in a poultry cradle at the unload location is located forward of the hock joints of a bird restrained in a poultry cradle at the unload location.

In one or more embodiments of the poultry cradle unloading systems described herein, the leg restraint of each poultry cradle of the plurality of poultry cradles comprises: a shank clamp positioned to receive and atraumatically retain a shank of a bird restrained in the poultry cradle, wherein the shank clamp comprises an open configuration in which the shank can be positioned in the shank clamp and a closed configuration in which the shank is retained in the shank clamp; and a shank guide positioned between the shank clamp and the head restraint, the shank guide restraining the shank of a bird restrained in the poultry cradle from movement in lateral and medial directions when the shank clamp is in the open configuration and the closed configuration.

In one or more embodiments of the poultry cradle unloading systems described herein, the system comprises a delivery chute comprising a receiving tray located below the unload location, the receiving tray configured to receive a bird released from a poultry cradle, wherein the delivery chute further comprises a slide portion extending from the receiving tray to a delivery end located below the receiving tray.

In one or more embodiments of the poultry cradle unloading systems described herein including a delivery chute, the system comprises a chute actuator operably connected to the delivery chute, the chute actuator configured to rotate the delivery chute about a chute axis extending through the receiving tray.

In one or more embodiments, the slide portion comprises a telescoping slide portion, wherein a slide distance between the receiving tray and the delivery end is configured to be adjusted between a minimum distance and a maximum distance.

In one or more embodiments of the poultry cradle unloading systems described herein including a delivery chute and a chute actuator, the chute actuator is operably connected to the controller, and wherein the controller is configured to operate the chute actuator to rotate the delivery chute about the chute axis such that the delivery end of the delivery chute is positioned above a selected location relative to the unload location.

In one or more embodiments of the poultry cradle unloading systems described herein including a delivery chute and a chute actuator, the controller is configured to operate the chute actuator to rotate the delivery chute about the chute axis such that the delivery end of the delivery chute is positioned above the selected location before operating the leg release actuator to move the leg restraint from the home position to the release position.

In one or more embodiments of the poultry cradle unloading systems described herein including a delivery chute and a chute actuator, the selected location comprises a first selected location of a plurality of selected locations located below the delivery chute. In one or more embodiments, the controller is configured to operate the chute actuator such that a selected number of birds are delivered to each selected location of the plurality of selected locations.

In a second aspect, one or more embodiments of a method of unloading a bird from a poultry cradle as described herein include: moving a poultry cradle to an unload location, wherein a head of a bird is retained in a head restraint of the poultry cradle and the legs of the bird are restrained in a leg restraint of the poultry cradle; releasing the head of the bird from the head restraint; releasing the legs of the bird from the leg restraint; and delivering the bird to a selected location after releasing the head of the bird from the head restraint and releasing the legs of the bird from the leg restraint.

In one more embodiments of methods of unloading a bird from a poultry cradle as described herein, the method comprises releasing the head of the bird before releasing the legs of the bird.

In one more embodiments of methods of unloading a bird from a poultry cradle as described herein, wherein delivering the bird to the selected location comprises directing the bird to the selected location using a delivery chute. In one or more embodiments, the method comprises rotating the delivery chute about a chute axis such that a delivery end of the delivery chute is located above the selected location. In one or more embodiments, the method comprises rotating the delivery chute such that the delivery end of the delivery chute is located above the selected location.

In one more embodiments of methods of unloading a bird from a poultry cradle as described herein, the method comprises delivering a plurality of birds to the selected location.

In one more embodiments of methods of unloading a bird from a poultry cradle as described herein, the selected location comprises a first selected location of a plurality of selected locations, and wherein the method comprises delivering a plurality of birds to each selected location of the plurality of locations. In one or more embodiments, delivering the plurality of birds to each selected location of the plurality of locations comprises directing the plurality of birds to each selected location of the plurality of selected locations using a delivery chute. In one or more embodiments, the method comprises rotating the delivery chute about a chute axis such that a delivery end of the delivery chute is located above each selected location of the plurality of selected locations.

In one more embodiments of methods of unloading a bird from a poultry cradle as described herein, releasing the legs of the bird from the leg restraint comprises contacting the leg release assembly with a force-limited contact assembly.

In one more embodiments of methods of unloading a bird from a poultry cradle as described herein, the poultry cradle is canted when in the unload location such that a ventral surface of the bird faces downward.

In one more embodiments of methods of unloading a bird from a poultry cradle as described herein, the poultry cradle in the unload location is canted such that a first vertical axis defined by gravity extending through the head of the bird is offset in a horizontal direction from a second vertical axis defined by gravity extending between the hock joints of the bird when the head of the bird is retained in the head restraint of the poultry cradle and the legs of the bird are restrained in the leg restraint of the poultry cradle. In one or more embodiments, a majority of a torso of the bird in a poultry cradle at the unload location is located between the first vertical axis and the second vertical axis.

In one more embodiments of methods of unloading a bird from a poultry cradle as described herein, the head of the bird in the poultry cradle at the unload location is located forward of the hock joints of the bird when the head of the bird is retained in the head restraint of the poultry cradle and the legs of the bird are restrained in the leg restraint of the poultry cradle.

In one more embodiments of methods of unloading a bird from a poultry cradle as described herein, at least one leg of the legs of the bird in the poultry cradle at the unload location is restrained in a shank clamp and a shank guide.

If used herein, relational terms such as above, below, top, bottom, etc. are (unless otherwise specified in this description and/or the claims) used only to facilitate description of the various features of the unloading systems and methods described herein and should not be construed to require any specific orientation of the unloading systems and/or the methods described herein unless otherwise specified (e.g., where gravitational force is used to achieve a desired result).

When used herein, the term "aligned with" as used in connection with various components, axes, directions of travel, etc. includes both parallel and generally parallel arrangements. For example, two axes (or other components, features, etc.) may be described as "aligned with" when the axes (or other components, features, etc.) are both perfectly parallel with each other or nearly parallel, e.g., the axes (or other components, features, etc.) may form an angle with each other that is greater than 0° but 10° or less.

If used herein, the term "substantially" has the same meaning as "significantly," and can be understood to modify the term that follows by at least about 75%, at least about 90%, at least about 95%, or at least about 98%. The term "not substantially" as used herein has the same meaning as "not significantly," and can be understood to have the inverse meaning of "substantially," i.e., modifying the term that follows by not more than 25%, not more than 10%, not more than 5%, or not more than 2%.

Numeric values used herein include normal variations in measurements as expected by persons skilled in the art and should be understood to have the same meaning as "approximately" and to cover a typical margin of error, such as +5% of the stated value.

Terms such as "a," "an," and "the" are not intended to refer to only a singular entity but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

The above summary of the invention is not intended to describe each embodiment or every implementation of the unloading systems and methods described herein. Rather, a more complete understanding of the invention will become apparent and appreciated by reference to the following description of illustrative embodiments and claims in view of the accompanying figures of the drawing.

Figure 1:
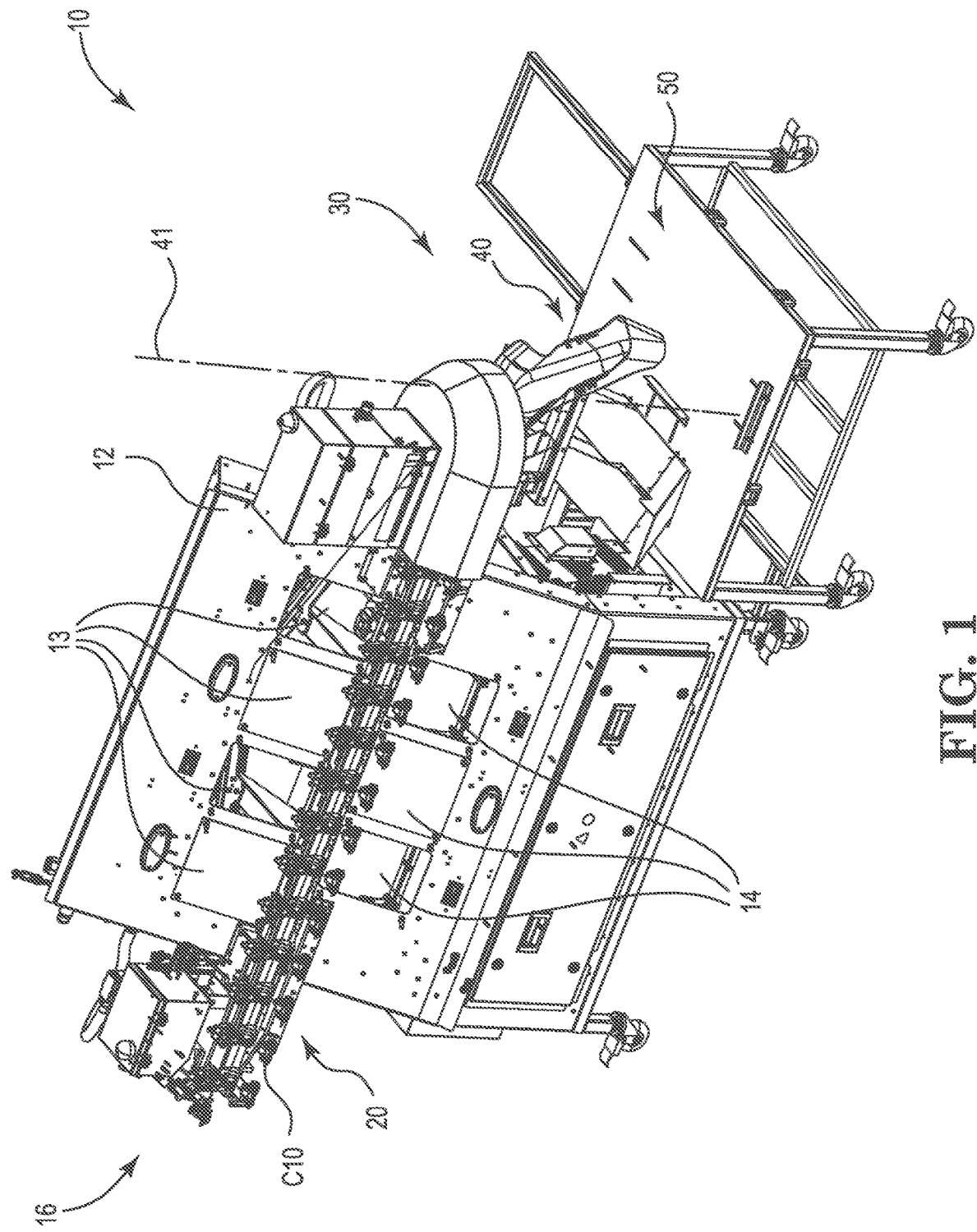
FIG. 1 is a front perspective view of one illustrative embodiment of a poultry processing system including a set of poultry cradles and one illustrative embodiment of a poultry cradle unloading system as described herein.

While the above-identified figures (which may or may not be drawn to scale) set forth some illustrative embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope of this invention.

DESCRIPTION OF ILLUSTRATIVE EMBODIMENTS

In the following description, reference is made to the accompanying figures of the drawing which form a part hereof, and in which are shown, by way of illustration, specific embodiments. It is to be understood that other embodiments may be utilized and changes may be made without departing from the scope of the present invention.

FIG. 1 depicts one embodiment of a poultry processing system used in the processing of birds, typically hatchlings. The poultry processing system 10 includes a poultry cradle transport apparatus 20 configured to move poultry cradles C10 around the system 10 from a loading station 16 to an unloading station/system 30. The poultry cradles C10 are loaded with a bird at the loading station 16 and transported across the face 12 of the poultry processing system 10 to an unloading station/system 30 where the birds are released from the poultry cradles, with the poultry cradles traveling back to the loading station 16 along a back side of the system 10.

The poultry cradle transport apparatus 20 may be in the form of a belt, chain, etc. to which the poultry cradles C10 are attached such that rotation or driving of the belt, chain, etc. of the poultry cradle transport apparatus 20 across the face 12 of the poultry processing system 10 moves the poultry cradles C10 across the face 12 from the loading station 16 to the unloading station/system 30.

Face 12 of the system 10 includes a plurality of upper processing stations 13 and lower processing stations 14 each of which may include an apparatus configured to perform one or more processes on the birds located in the poultry cradles C10. Processes that may be performed on the birds retained in the poultry cradles C10 include, but are not limited to, beak treatments, claw treatments, inoculations, nutrient or other material delivery, etc.

In one or more embodiments, poultry cradles that may be used in connection with the poultry cradle transport apparatus and/or the poultry cradle unloading systems described herein may be described in U.S. Provisional application titled POULTRY CRADLES AND METHODS OF RESTRAINING POULTRY filed on even date herewith in the name of Applicant Nova-Tech Engineering, LLC (U.S. Provisional Patent Application 63/273,430).

In one or more embodiments, one or more of the processing stations may be in the form of a forward-facing poultry claw positioning and/or processing system as described in described in the U.S. Provisional application titled POULTRY TOE AND CLAW POSITIONING SYSTEM AND METHOD filed on even date herewith in the name of Applicant Nova-Tech Engineering, LLC (U.S. Provisional Patent Application 63/273,414). In one or more embodiments, one or more of the processing stations may be in the form of a rear-facing poultry claw detection and/or processing system as described in described in the U.S. Provisional application titled REAR-FACING POULTRY CLAW SYSTEM AND METHOD filed on even date herewith in the name of Applicant Nova-Tech Engineering, LLC (U.S. Provisional Patent Application 63/273,423). In one or more embodiments, one or more of the processing stations may be in the form of a poultry beak processing and/or masking system as described in described in the U.S. Provisional application titled POULTRY BEAK PROCESSING SYSTEM AND METHOD filed on even date herewith in the name of Applicant Nova-Tech Engineering, LLC (U.S. Provisional Patent Application 63/273,438).

The unloading station/system 30 of the poultry processing system 10 includes an optional delivery chute 40 configured to deliver birds released from the poultry cradles C10 to one or more containers provided on a container platform 50 positioned beneath the delivery chute 40. Although container platform 50 is in the form of a table supported on casters, any suitable support for one or more containers configured to receive processed birds may be used in place of platform 50.

Figure 2:
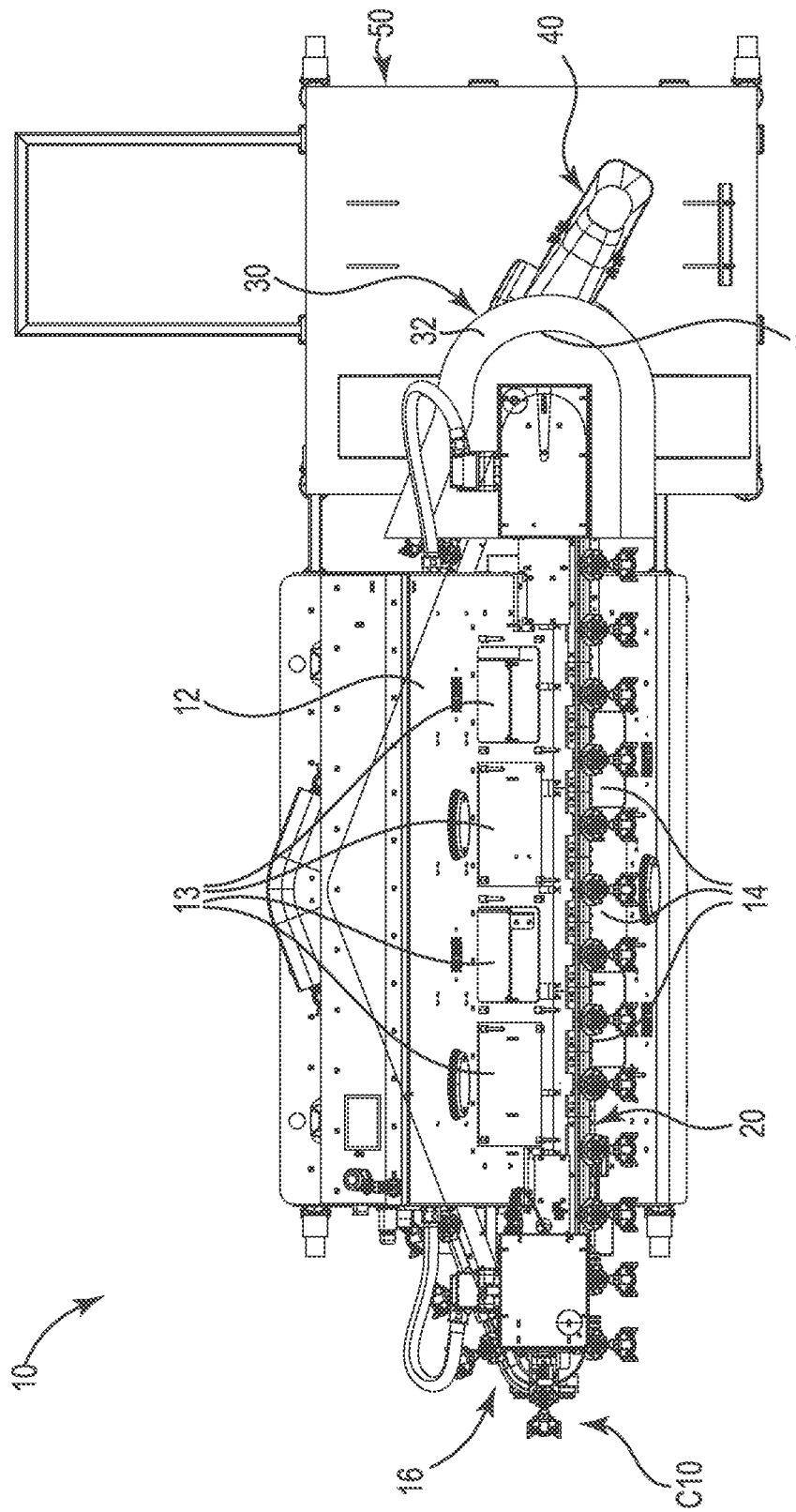
FIG. 2 is a top view of the poultry processing system of FIG. 1.
Figure 3:
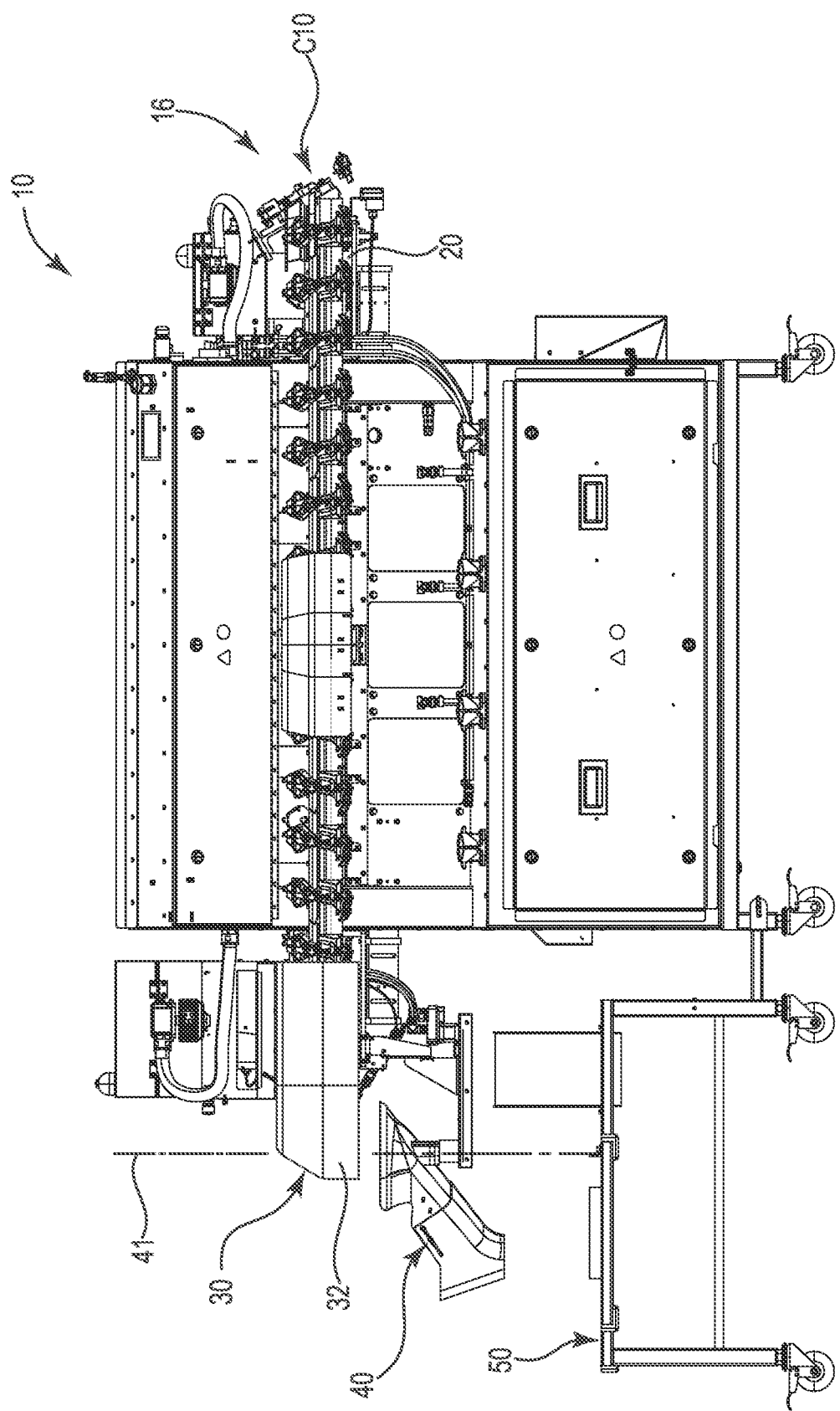
FIG. 3 is a rear view of the poultry processing system of FIG. 1.
Figure 4:
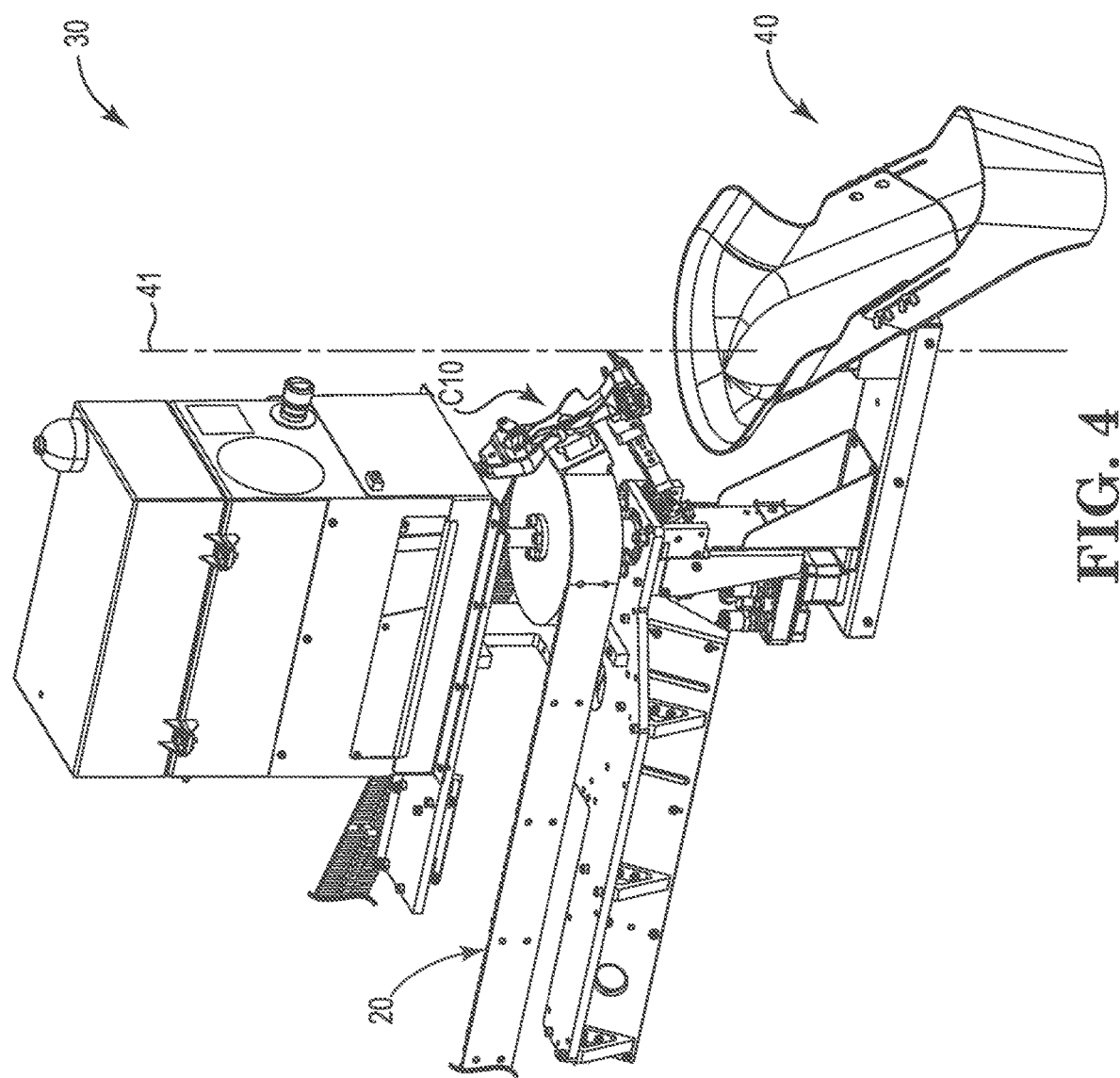
FIG. 4 is perspective view of the illustrative embodiment of the poultry cradle unloading system of the poultry processing system of FIG. 1 with the shroud removed.
Figure 5:
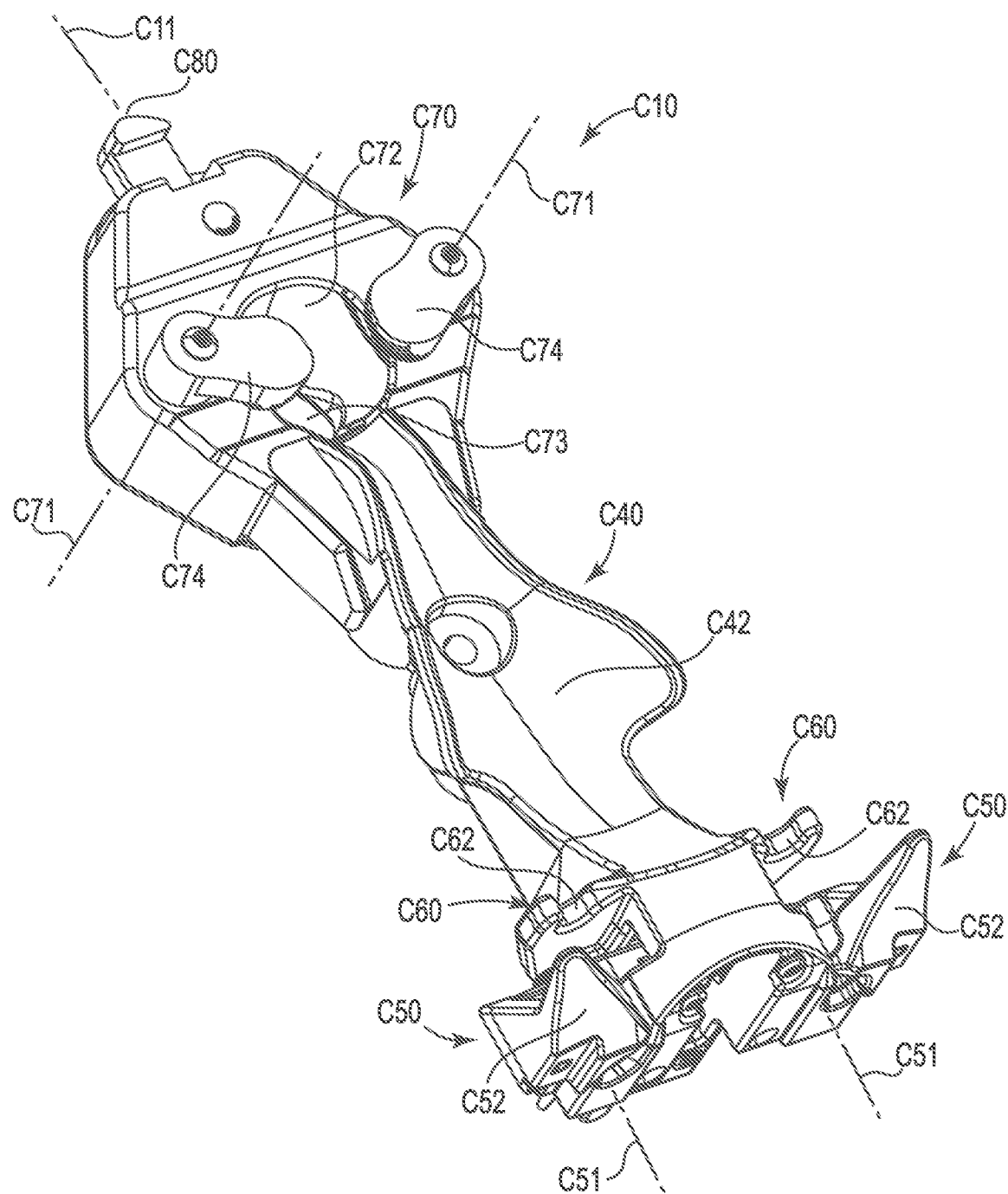
FIG. 5 is a perspective view of one illustrative embodiment of a poultry cradle that can be used in connection with the poultry cradle unloading systems as described herein with the head restraint and the leg restraint in their respective closed configurations.
Figure 6:
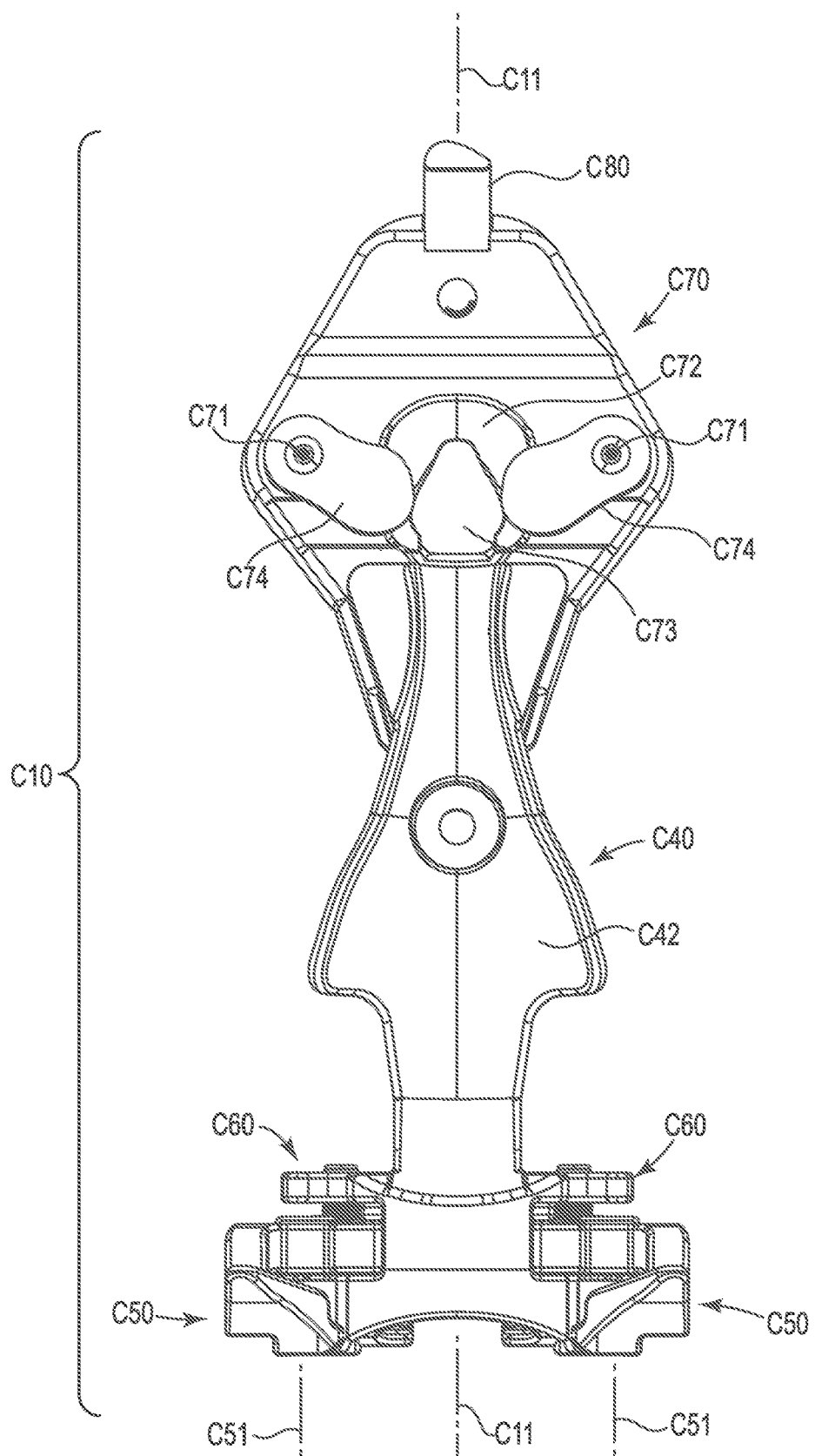
FIG. 6 is front plan view of the poultry cradle of FIG. 5.
Figure 7:
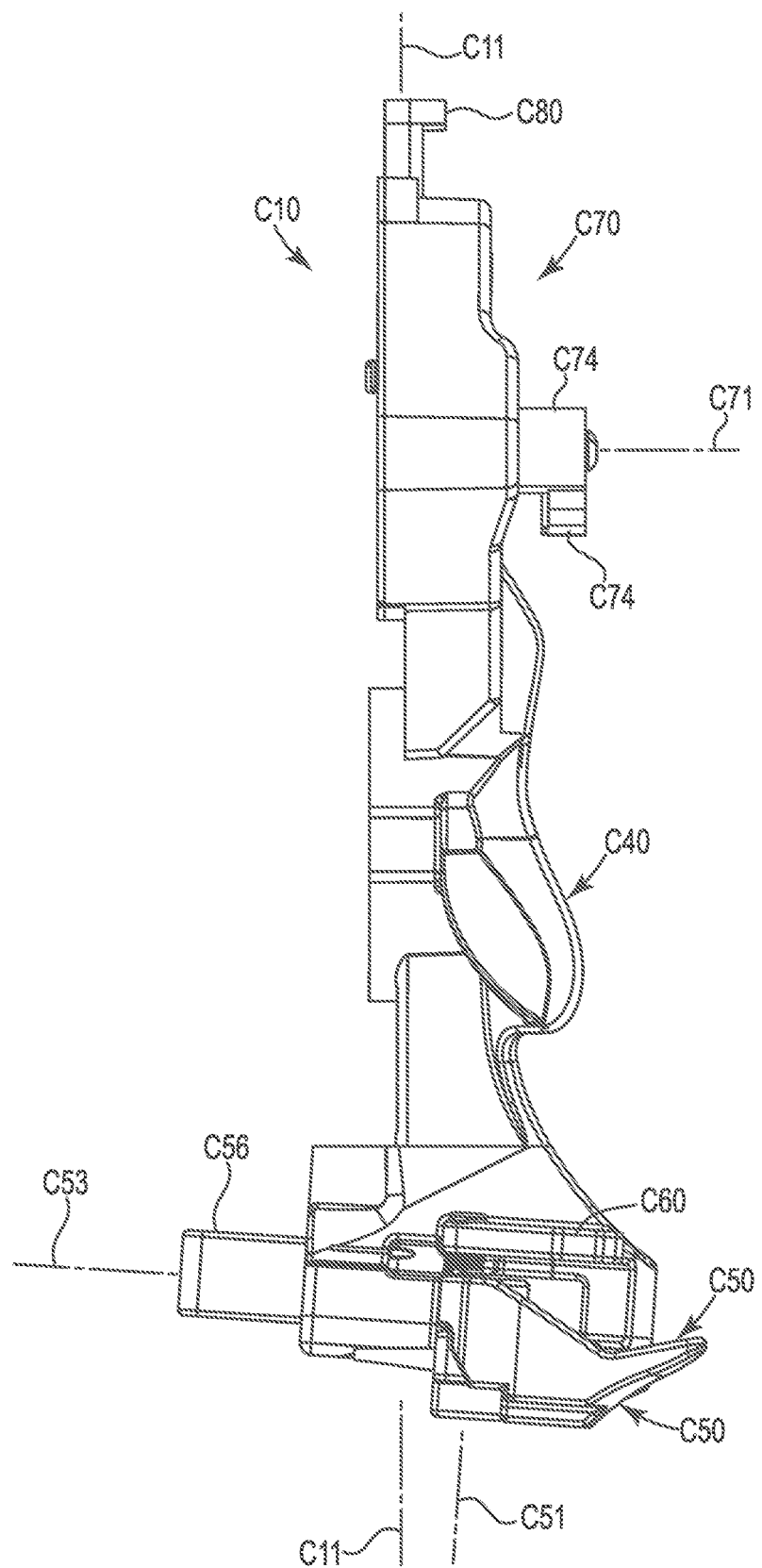
FIG. 7 is a side plan view of the poultry cradle of FIG. 5.

The unloading station/system 30 of the poultry processing system 10 is, in the depicted illustrative embodiment, covered by a shroud 32 in each of FIGS. 1-3. In FIG. 4, the shroud 32 is removed to expose various components that may be provided in one or more embodiments of a poultry cradle unloading system 30 as described herein. In particular, the belt of the depicted illustrative embodiment of a poultry cradle transport apparatus 20 is depicted in FIG. 4. For clarity, only one poultry cradle C10 is attached to the poultry cradle transport system 20 in the view of FIG. 4. The depicted poultry cradle C10 of FIG. 4 is in an unload location of the poultry cradle transport apparatus 20. As depicted in FIG. 4, the poultry cradle C10 in the unload location is positioned above the delivery chute 40 such that a bird released from the poultry cradle C10 at the unload location falls under the force of gravity to the delivery chute 40 positioned beneath the unload location.

The optional delivery chute 40 depicted in FIG. 4 is configured for rotation about a chute axis 41 such that, as will be described herein, the birds released from poultry cradles C10 at the unload location can be distributed to one or more selected locations by the delivery chute 40.

The illustrative embodiment of the poultry cradle unloading system 30 is depicted in FIGS. 1-4 along with one illustrative embodiment of a poultry cradle C10 in which a bird B is restrained (preferably atraumatically) which is depicted separately in FIGS. 5-13. The poultry cradle C10 is depicted in a perspective view in FIG. 5, a front view in FIG. 6, and a side view in FIG. 7.

Figure 8:
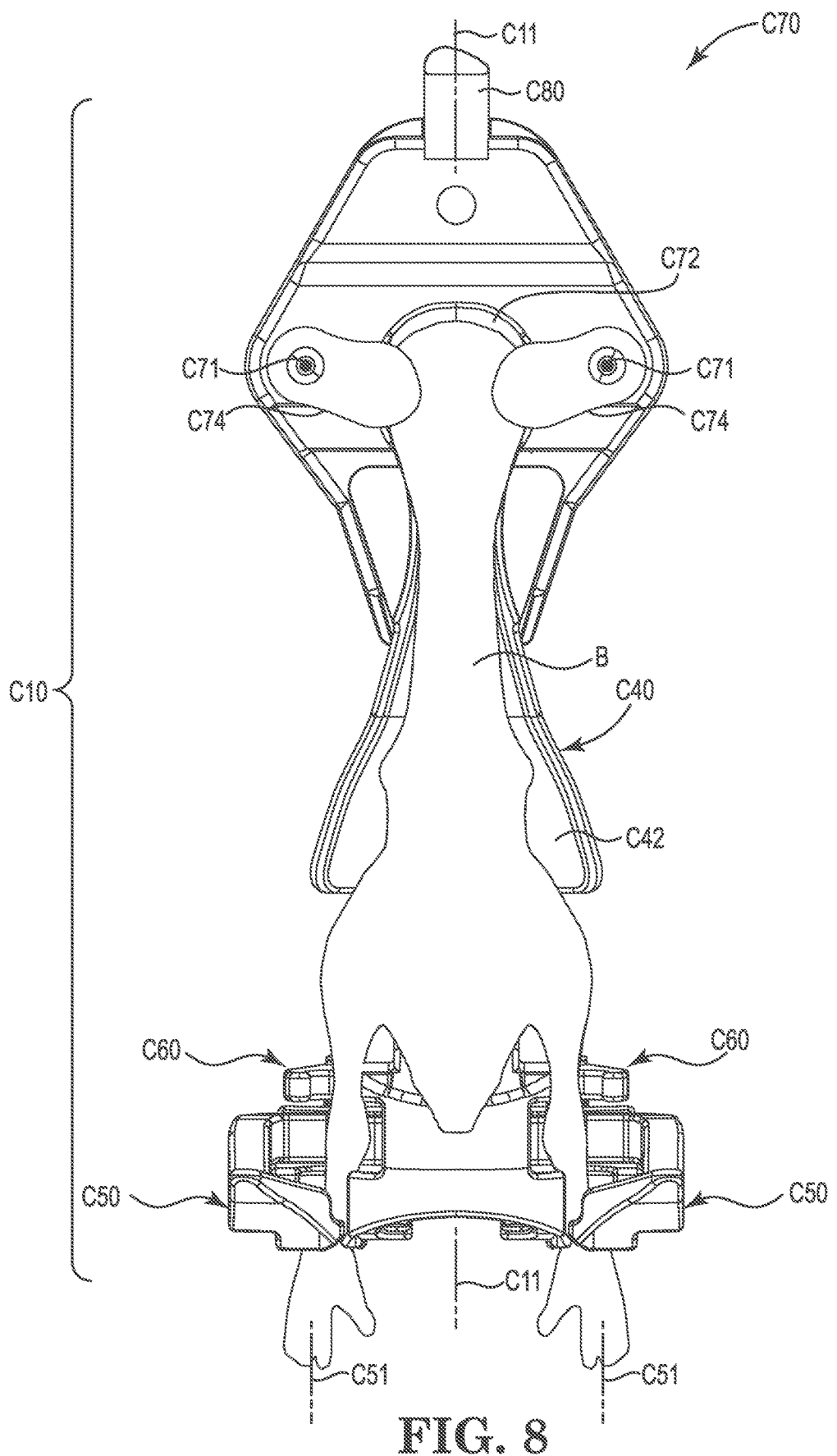
FIG. 8 is a front view of the cradle of FIGS. 5-7 with a bird restrained therein.
Figure 9:
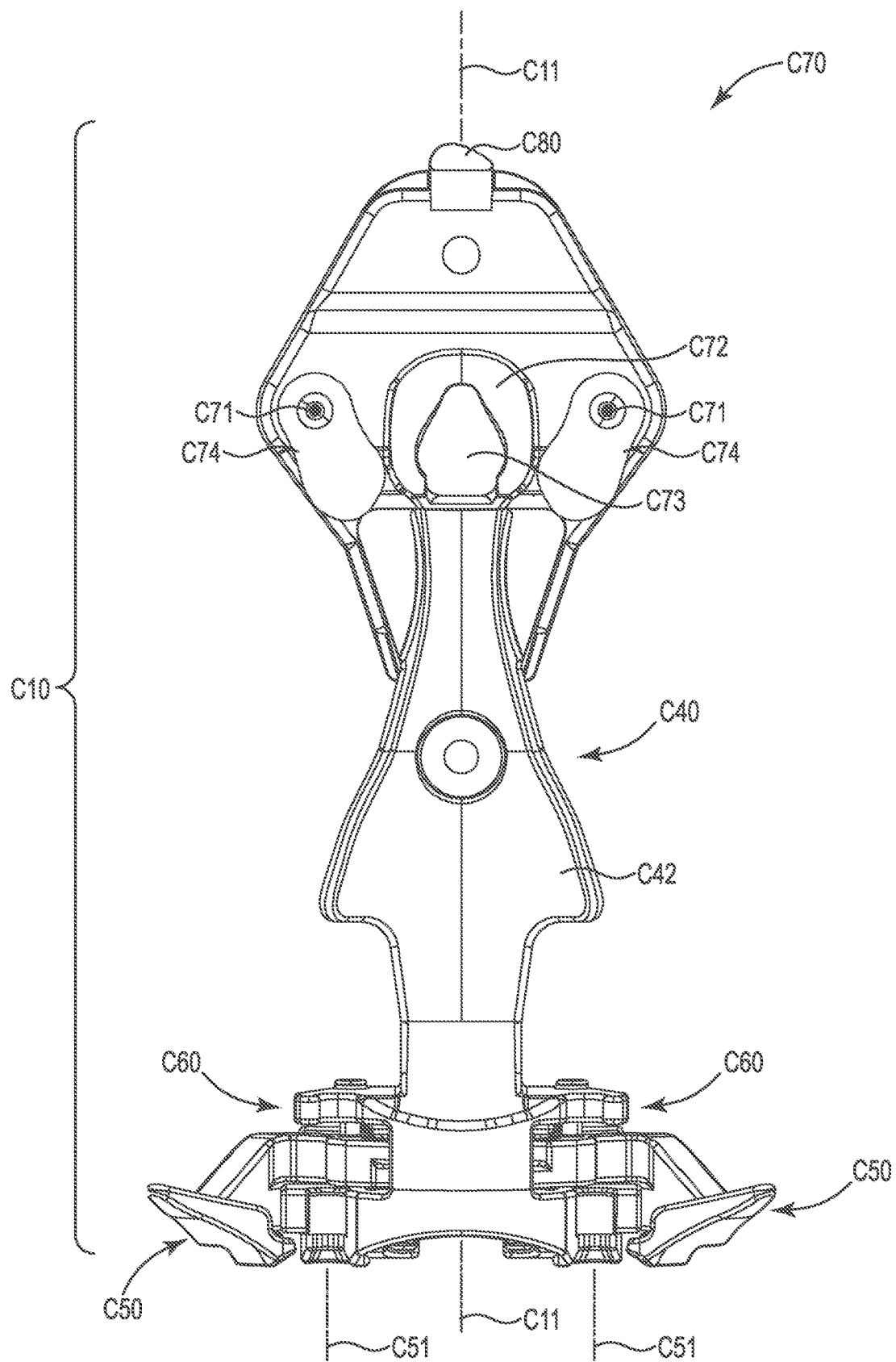
FIG. 9 is a front view of the cradle of FIGS. 5-7 with the head restraint and the leg restraint in their respective release and open configurations.
Figure 10:
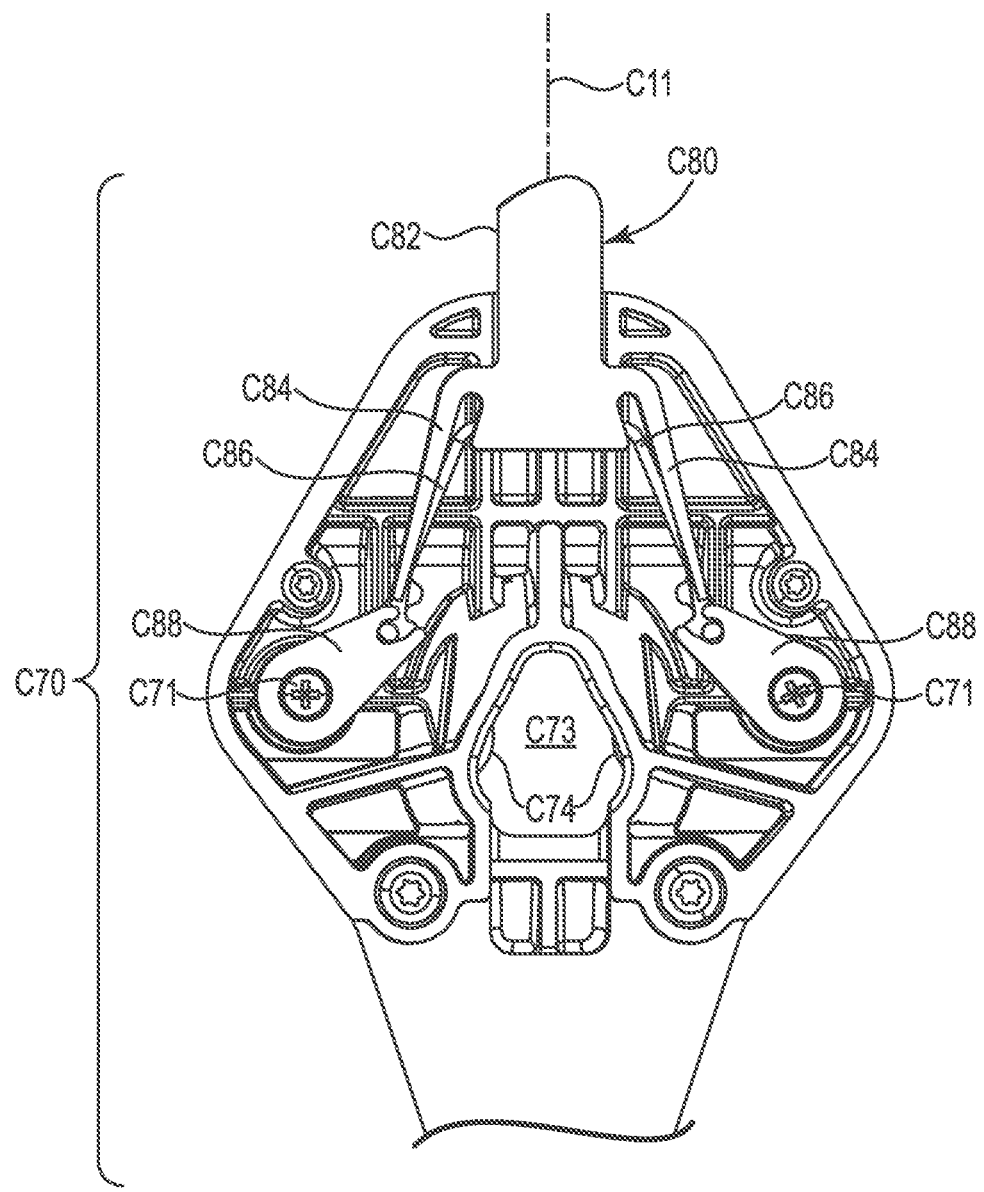
FIG. 10 is an enlarged rear view of components in the head restraint of the cradle of FIGS. 5-7 when the head restraint is in the closed configuration.
Figure 11:
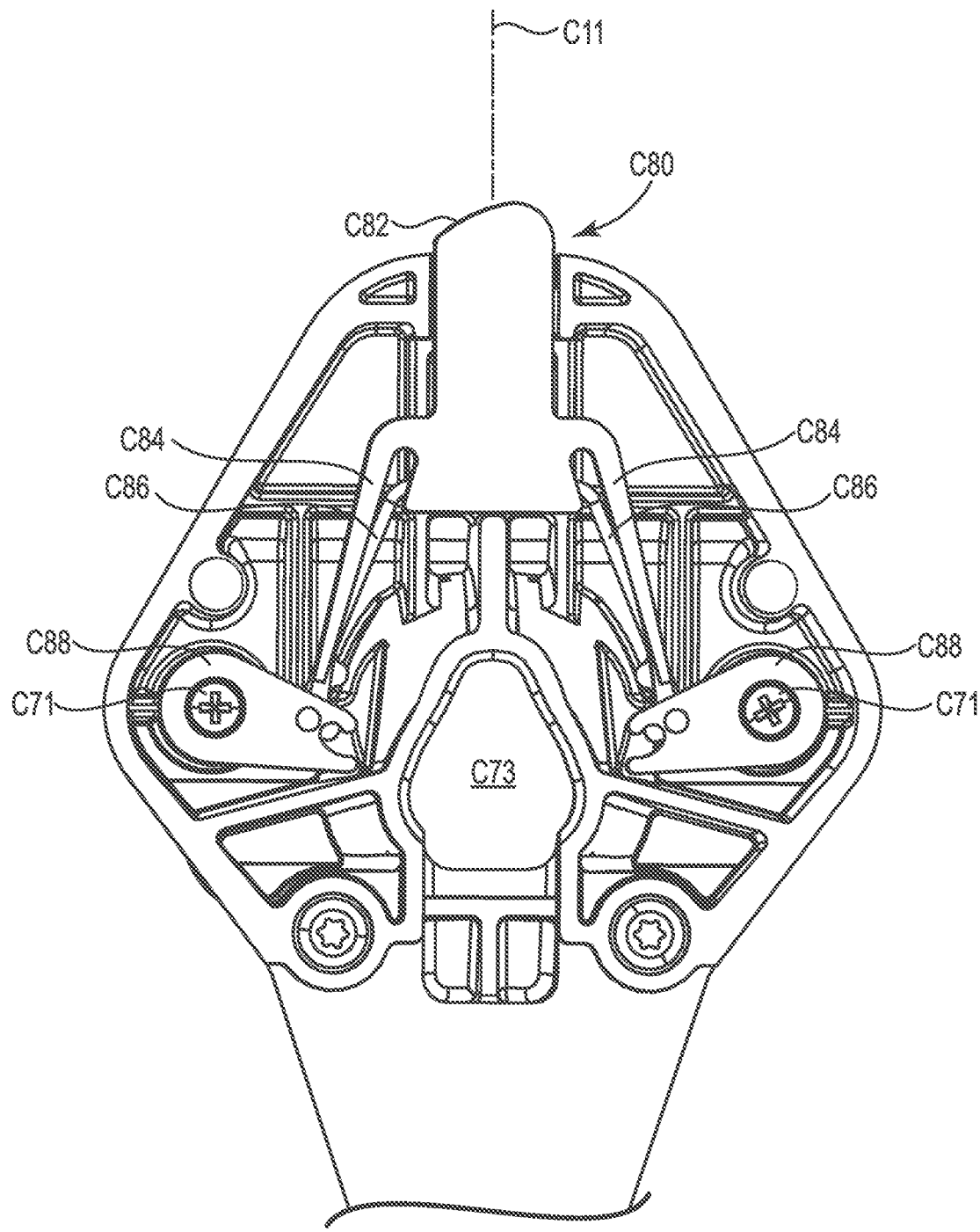
FIG. 11 is an enlarged rear view of components in the head restraint of the cradle of FIGS. 5-7 when the head restraint is in the release configuration.
Figure 12:
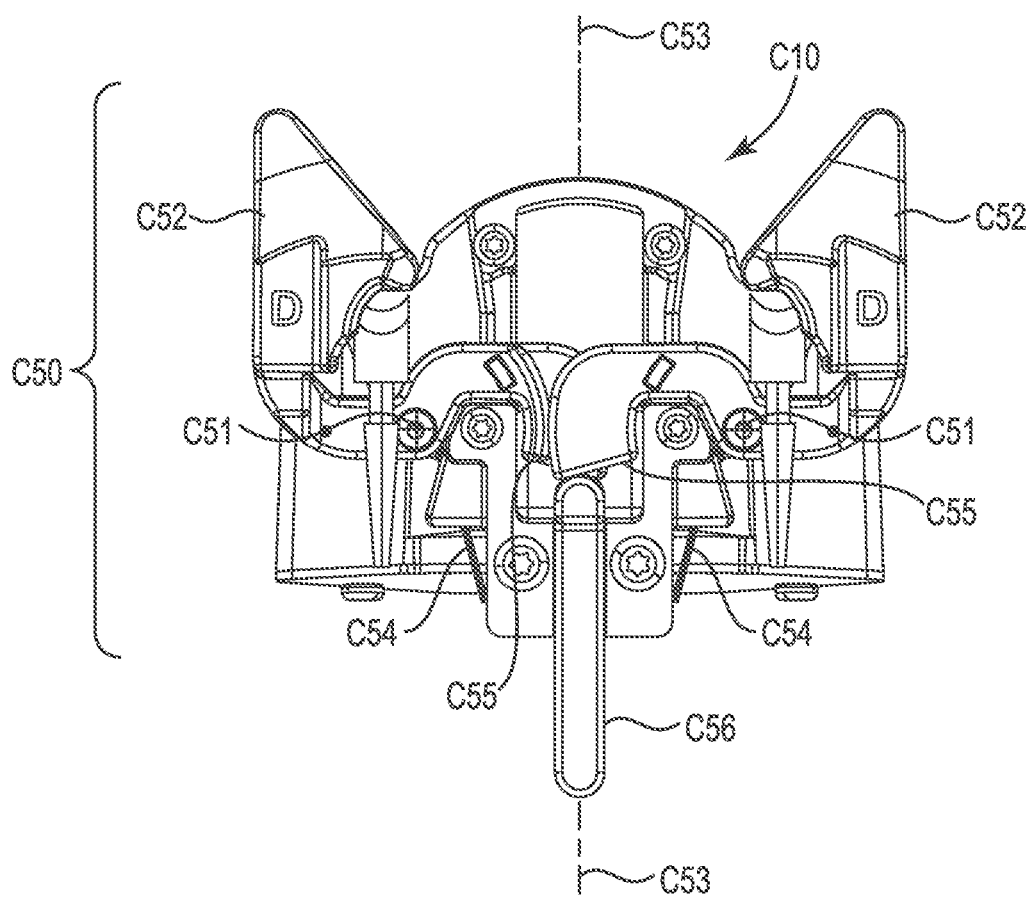
FIG. 12 is an enlarged bottom view of components in the leg restraint of the cradle of FIGS. 5-7 when the leg restraint is in the closed configuration.
Figure 13:
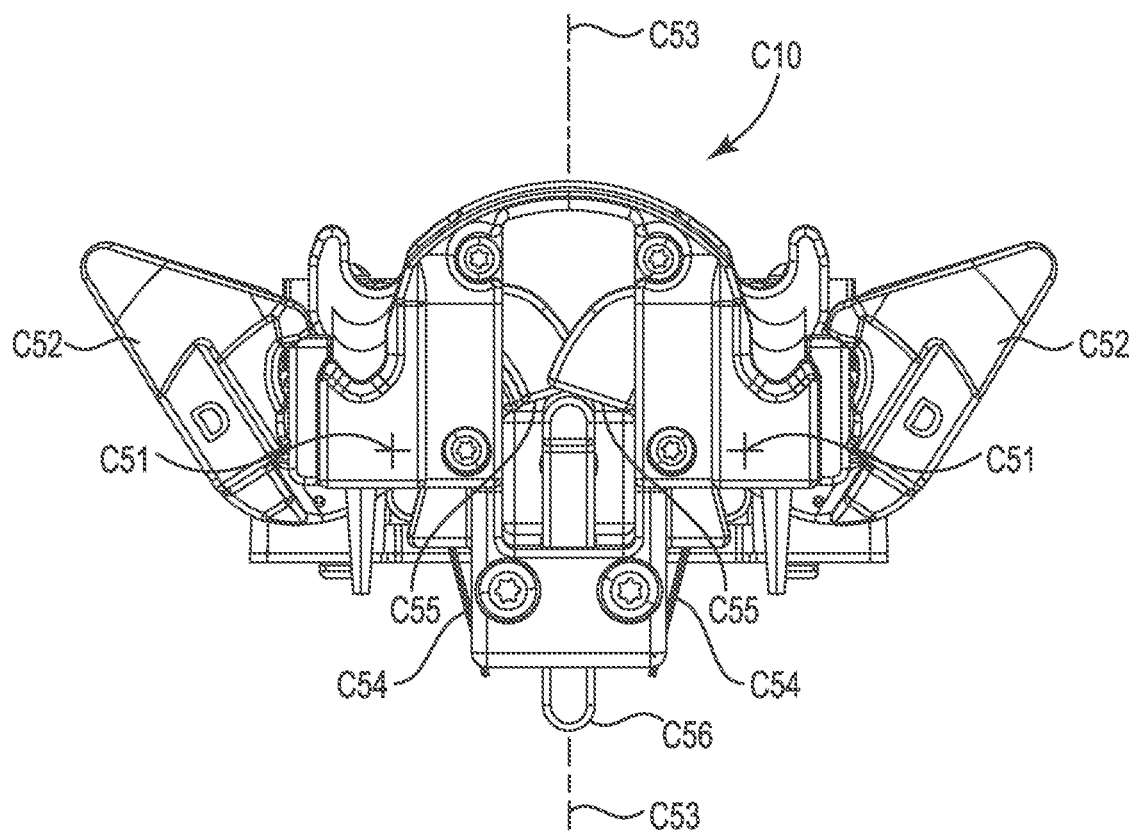
FIG. 13 is an enlarged bottom view of components in the leg restraint of the cradle of FIGS. 5-7 when the leg restraint is in the open configuration.

The poultry cradle C10 is depicted with a bird B restrained therein in FIG. 8 by the head restraint and the leg restraint in their closed configurations to retain the bird B. The illustrative embodiment of the poultry cradle C10 is depicted in a second front view in FIG. 9 with the head restraint and the leg restraint of the cradle C10 in their release configurations (as compared to the closed configurations in, for example, FIG. 6). FIG. 10 is an enlarged rear view of components in the head restraint of the poultry cradle C10 when the head restraint is in the closed configuration and FIG. 11 is an enlarged rear view of components in the head restraint of the poultry cradle C10 when the head restraint is in the release configuration. FIG. 12 is an enlarged bottom view of components in the leg restraint of the poultry cradle C10 when the leg restraint is in the closed configuration and FIG. 13 is an enlarged bottom view of components in the leg restraint of the poultry cradle C10 when the leg restraint is in the open configuration.

The depicted illustrative poultry cradle C10 includes a torso support C40, a pair of leg restraints each including a shank clamp C50 and an optional shank guide C60, and a head restraint C70. The various components may be operably attached in a manner that provides for atraumatic restraint of a bird positioned in the poultry cradle C10.

In one or more embodiments, the torso support C40 includes a support surface C42 shaped to generally follow the anatomical shape of the torso of a bird located in the poultry cradle C10 such that the torso of the bird is generally evenly supported. As a result, the shape of the support surface C42 may be different depending on the breed, age, gender, etc. of the birds that are to be restrained in the poultry cradle C10.

The leg restraints are provided and positioned to restrain the left and right shanks of a bird having its torso supported by the torso support C40. The depicted illustrative embodiment of each leg restraint includes a shank clamp C50 positioned to retain a shank of a bird at a location below the joint commonly referred to as the "hock" joint and above the joints of the forward-facing toes at the distal/inferior end of the shank, while the optional shank guide C60 is positioned to act on the shank above or proximal/superior to the shank clamp C50.

While the shank clamps C50 prevent the bird from moving its shank in any direction other than along the length of its shank (aligned with axes C51), the depicted illustrative embodiments of shank guides C60 can help to limit or prevent movement of the shanks contained therein along the lateral and medial directions of the restrained bird. The shank guides C60 include a slot C62 configured to receive a shank of bird positioned in the shank clamp C50 located below/inferior to the shank guide C60. Because the shank guide is in the form of a slot C62, the shank guide C60 alone cannot restrain movement of a shank of a restrained bird in the dorsal direction.

In one or more embodiments, the leg restraints are configured to move between a closed configuration in which the shanks of the bird are retained in the shank clamps C50 and an open configuration in which the shanks of the bird are no longer retained in the shank clamps C50. Although the depicted shank clamps C50 include arms C52 that rotate, other structures (such as, e.g., inflatable bladders, etc.) may be used to retain a bird's shanks in the leg restraints when the leg restraints are in the closed configuration.

The shank clamps C50 of the depicted illustrative embodiment of leg restraints used on poultry cradle C10 may be normally closed but constructed such that they open in response to the forces generated as a shank is being inserted into the shank clamp C50 (the shank clamps C50 may be, e.g., spring-loaded, etc.). In other embodiments, the shank clamps C50 may have defined open and closed configurations between which the clamps can be moved to accept and/or retain a shank of a bird being restrained. In one or more embodiments, the arms C52 of the shank clamps may rotate about clamp axes C51 when moving between the open and closed configurations.

The depicted illustrative embodiment of poultry cradle C10 may also include a head support C70 operably attached to the torso support C40 and positioned to support the head of a bird located in the poultry cradle C10. The head support C70 includes a first side facing the head of a bird retained in the poultry cradle C10. The head support C70 may preferably include a beak receiving passage C72 extending through the head support C70 to an opening C73 on the second side of the head support C70. In one or more embodiments, the beak receiving passage C72 preferably extends through the head support C70 such that at least a portion of the beak of a bird retained in the poultry cradle C10 extends through the opening C73 of the beak receiving passage C72 and is exposed proximate the second surface of the head support C70 (where the second side of the head support C70 faces away from the head of a bird retained in the poultry cradle C10).

The depicted illustrative embodiment of head restraint C70 on poultry cradle C10 includes head clamps C74 movable between a release configuration and a closed configuration. In the release configuration (see FIG. 9), the head clamps C74 are preferably positioned such that the head of a bird can be positioned in the head restraint C70 with the beak extending through the beak receiving passage C72 and protruding from the opening C73 on the second side of the head support C70. In the closed configuration, the head clamps C74 function to retain the head of a bird in the head restraint C70 such that its beak extends into the beak receiving passage C72 and preferably protrudes through the opening C73 on the second side of the head restraint C70. The head clamps C74 rotate about head clamp axes C71 when moving between their release and closed configurations.

With reference to FIGS. 10-11, an enlarged rear view of components in the head restraint of the poultry cradle C10 when the head restraint is in the closed configuration, the head restraint C70 includes an activation post C80 that includes an activation end C82 and a pair of activation arms C84 that are operably connected to activation paddles C88. Activation paddles C88 are operably connected to the head clamps C74 such that rotation of activation paddles C88 causes corresponding rotation of the head clamps C74. Activation arms C84 are biased outwardly away from the opening C73 by a spring member C86.

Movement of the activation post C80 downward along axis C11 toward the opening C73 causes activation paddles C88 to rotate downward (in other words, activation paddle C88 on the right side of FIG. 10 rotates counterclockwise and left side activation paddle C88 rotates clockwise) with the rotation of activation paddles C88 to their positions as seen in FIG. 11 causing corresponding rotation in head clamps C74. Movement of activation post C80 along axis C11 away from the opening C73 causes activation paddles C88 to rotate upward from the position seen in FIG. 11 to the position seen in FIG. 10 (in other words, activation paddle C88 on the right side of FIG. 11 rotates clockwise and left side activation paddles C88 rotates counterclockwise) with the rotation of activation paddles C88 to their positions as seen in FIG. 10 causing corresponding rotation in head clamps C74.

Structures similar to the head support C70 and clamps C74 may be described in, e.g., U.S. Pat. No. 5,651,731 titled METHOD AND APPARATUS FOR DEBEAKING POULTRY; U.S. Pat. No. 7,232,450 titled APPARATUS AND METHOD FOR UPPER AND LOWER BEAK TREAT- MENT; U.S. Patent Application Publication US 2005/0101937 A1 titled APPARATUS AND METHOD FOR NASAL DELIVERY OF COMPOSITIONS TO BIRDS; U.S. Pat. No. 7,363,881 titled BEAK TREATMENT WITH TONGUE PROTECTION; etc. Another illustrative embodiment of a head clamp used with a head holder in a poultry cradle includes the keeper apparatus described in U.S. Pat. No. 9,808,328 (POULTRY CARRIERS AND METHODS OF RESTRAINING POULTRY). Other examples of suitable structures for head clamps are also possible.

With reference to FIGS. 12-13, opening and closing of the arms C52 of the shank clamps C50 rotate about axes C51 when moving between their open and closed configurations as described herein. As depicted in FIG. 12, the arms C52 of the shank clamps C50 are in their closed configuration. In the depicted illustrative embodiment, the arms C52 are biased in the closed configuration by a pair of spring members C54 (different portions of which are visible in FIGS. 12-13). Movement of the arms C52 of the shank clamps C52 to their open configuration as seen in FIG. 13 is, in the depicted illustrative embodiment caused by advancement of the arm activator C56 along arm axis C53 which causes ends C55 of arms C52 to move upward in the view of FIG. 12 to their location as depicted in FIG. 13. In that position (as seen in FIG. 13) the arms C52 allow for release of a shank of a bird retained in the shank clamps C50. As discussed herein, loading of a bird into the depicted illustrative embodiment of poultry cradle C10 does not require active opening of the arms C52. Rather, the arms C52 open in response to pressure exerted during insertion of the shank of a bird into the shank clamps C50.

Figure 14:
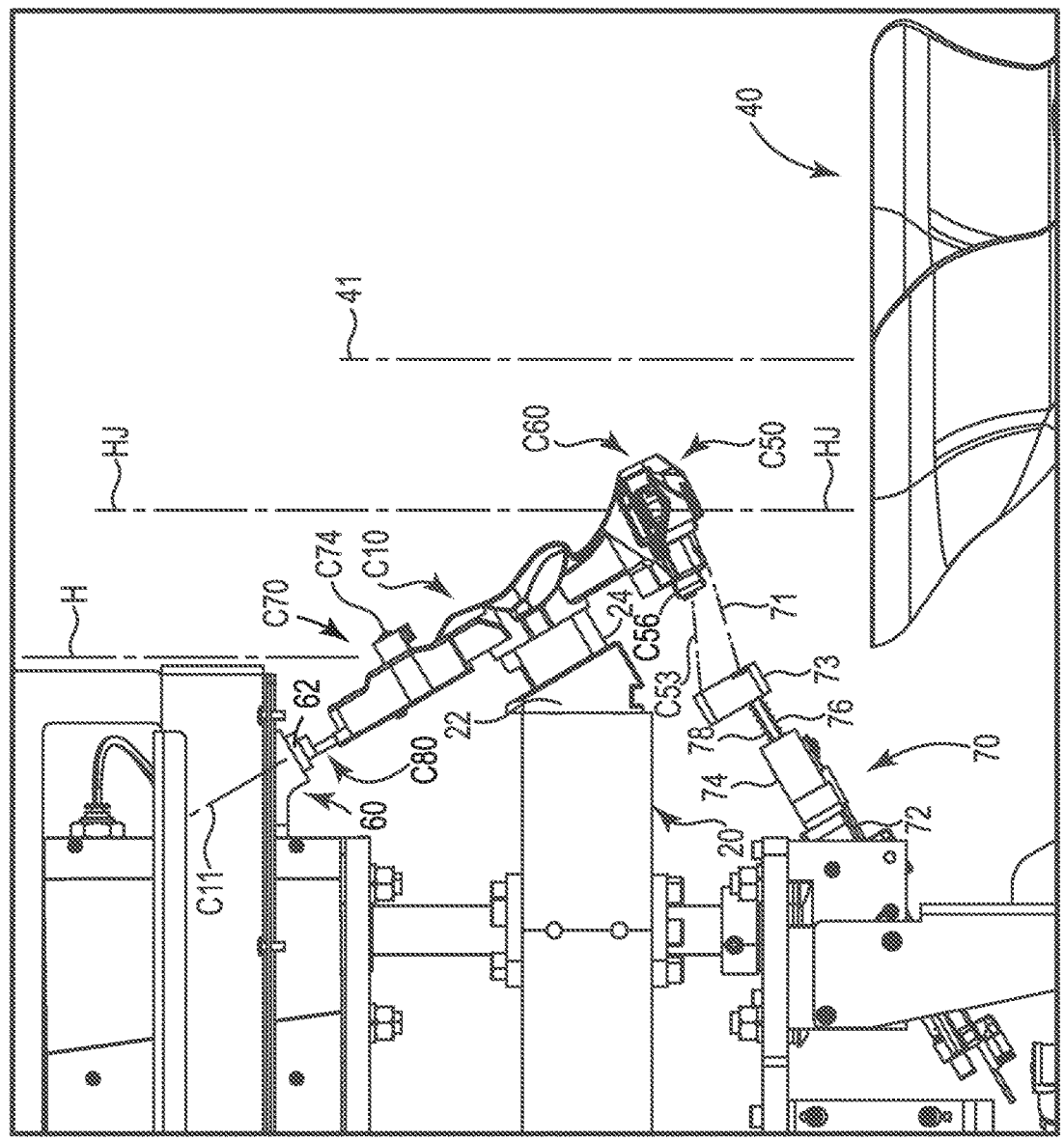
FIG. 14 is an enlarged side view of the poultry cradle unloading system of the poultry processing system of FIGS. 1 and 4 with the shroud removed and the head release apparatus and leg release apparatus in their respective home positions.

FIG. 14 depicts one illustrative embodiment of a poultry cradle C10 in the unload location of a poultry cradle unloading system as described herein. The poultry cradle C10 is positioned above the delivery chute 40. The poultry cradle unloading system depicted in FIG. 14 includes a head release apparatus 60 and a leg release apparatus 70.

Figure 15:
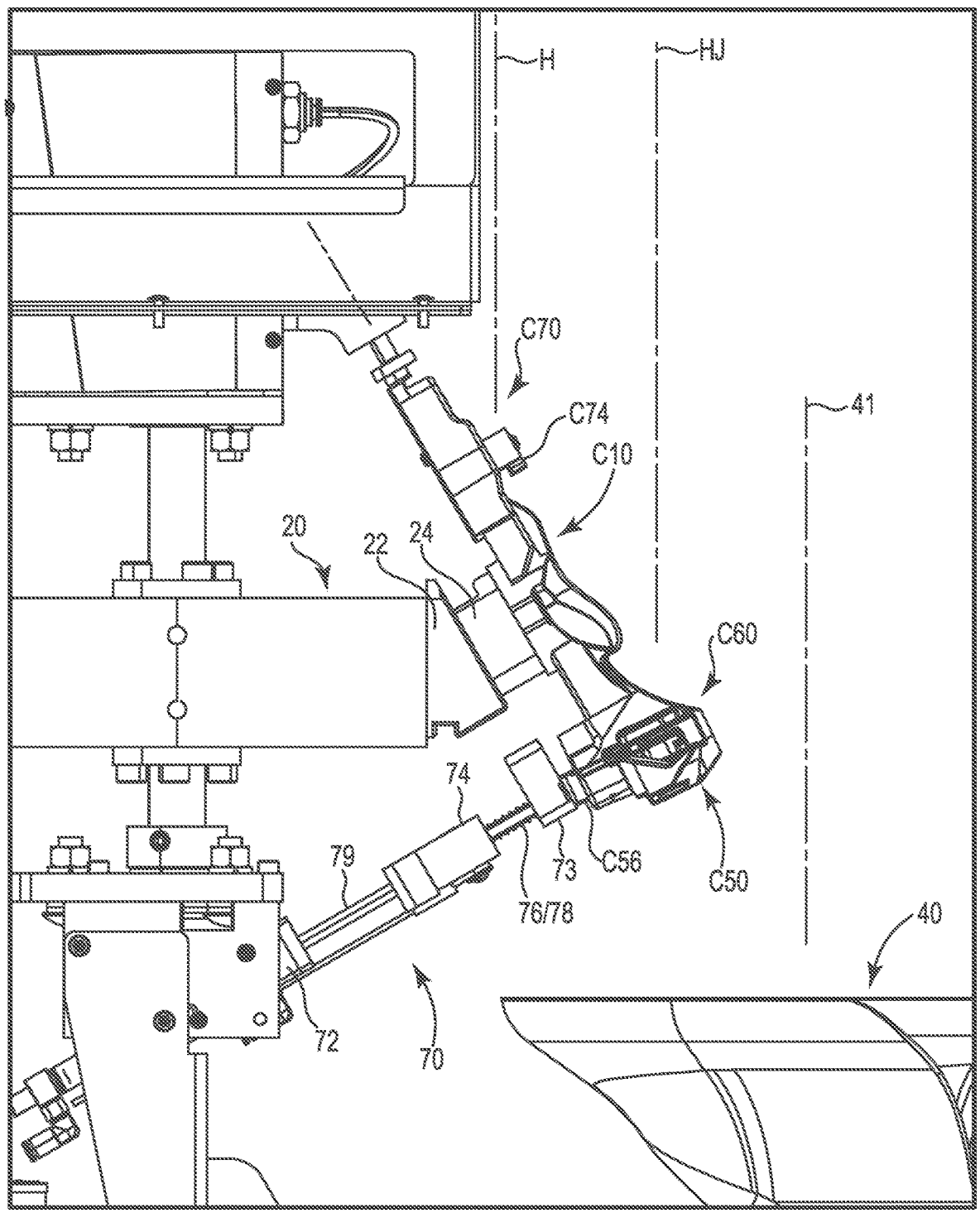
FIG. 15 is an enlarged side view of the poultry cradle unloading system of the poultry processing system of FIG. 14 with the head release apparatus and leg release apparatus in their respective release positions.

The head release apparatus 60 is configured to move between a home position and a release position. The head release apparatus 60 is in its home position as depicted in FIG. 14, while FIG. 15 depicts the head release apparatus 60 in its release position. The head release apparatus 60 is configured to move the head restraint of the poultry cradle C10 in the unload location from the closed configuration to the release configuration in which the head of a bird retained in the poultry cradle C10 is no longer retained by the head restraint when the head release apparatus 60 moves from its home position to its release position.

As discussed above in connection with the illustrative embodiment of poultry cradle C10, movement of the activation post C80 towards the opening C73 (or, in the case of FIG. 14, towards head clamps C74 of head restraint C70) causes head clamps C74 of head restraint C70 to move to their open position such that the head of a bird is no longer retained in the head restraint C70 of cradle C10. In the depicted illustrative embodiment, head release apparatus 60 is in the form of a plunger 62 configured to move along axis C11 to move activation post C80 towards opening C73/head clamps C74 as discussed herein.

The plunger 62 of head release apparatus 60 may be moved using a head release actuator (not visible in FIGS. 14-15) that is configured to move the plunger 62 of the head release apparatus between its home position and release position as described herein. The head release actuator may take any suitable form that functions to move the plunger 62 of the head release apparatus between its home and release configurations. Examples of potentially useful actuators include, but are not limited to, a pistons/cylinders operated hydraulically, pneumatically, using a solenoid, etc., a motor with or without a gear assembly (e.g., a rack and pinion, etc.), magnetic/electromagnetic linear actuators, rotary actuators (e.g., pneumatic actuators, magnetic/electromagnetic actuators, etc.), etc.

The leg release apparatus 70 is configured to move between a home position and a release position. The leg release apparatus 70 is in its home position as depicted in FIG. 14, while FIG. 15 depicts the leg release apparatus 70 in its release position. The leg release apparatus 70 is configured to move the leg restraint of the poultry cradle C10 in the unload location from the closed configuration to an open configuration in which the legs (e.g., shanks) of a bird retained in the poultry cradle C10 are no longer retained by the leg restraint when the leg release apparatus 70 moves from its home position to its release position.

Figure 16:
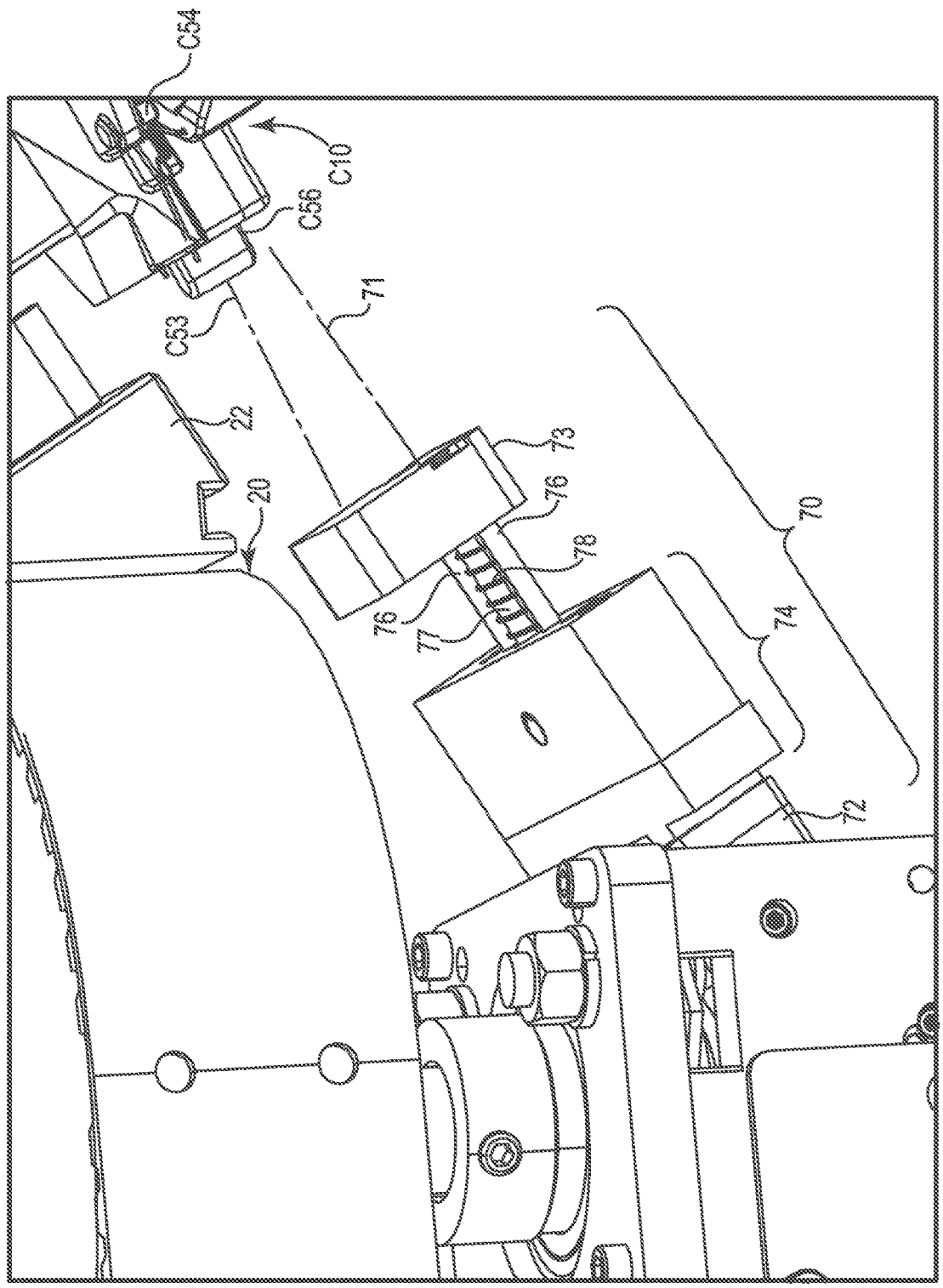
FIG. 16 is an enlarged view of the leg release apparatus of FIGS. 14-15 with the leg release apparatus in its home position.

In the depicted illustrative embodiment of leg release apparatus 70, the apparatus 70 includes a contact assembly configured to contact the arm activator C56 of the leg restraints on poultry cradle C10 located in the unload location when the leg release apparatus 70 is moving into its open configuration as depicted in FIG. 15. With reference to FIG. 16, the contact assembly of leg release apparatus 70 includes a base 72 and contact member 73 extending from shuttle 74. Shuttle 74 is mounted on rails 79 extending from the base 72 of the leg release apparatus 70 for movement along leg release apparatus axis 71 relative to base 72 and the cradle C10.

Contact member 73 is mounted on rails 76 extending from the shuttle 74 with rails 76 preventing rotation of the contact member 73 relative to the shuttle 74 as the contact member 73 moves towards and away from the shuttle 74 along leg release apparatus axis 71.

Shuttle 74 and contact member 73 of the depicted illustrative embodiment of the contact assembly of leg release apparatus 70 are moved towards the arm activator C56 of the leg restraints C50 on poultry cradle C10 using a leg release actuator (not visible in FIGS. 14-16) that is configured to move the shuttle 74 of the leg release apparatus 70 between its home position and release position as described herein.

The leg release actuator may take any suitable form that functions to move the shuttle 74 and contact member 73 of the leg release apparatus between its home and release configurations. Examples of potentially useful actuators include, but are not limited to, a pistons/cylinders operated hydraulically, pneumatically, using a solenoid, etc., a motor with or without a gear assembly (e.g., a rack and pinion, etc.), magnetic/electromagnetic linear actuators, rotary actuators (e.g., pneumatic actuators, magnetic/electromagnetic actuators, etc.), etc.

The contact assembly of the depicted embodiment of leg release apparatus 70 also includes an optional biasing member 78 such that the contact assembly is a dampened contact assembly. Biasing member 76 is configured to bias the contact member 73 into an extended configuration relative to the shuttle 74. Contact between the contact member 73 and the arm activator C56 of the leg restraints of poultry cradle C10 located in the unload location when the leg release apparatus 70 is moving into its open configuration moves the contact member 73 towards the shuttle 73 as the biasing member 76 is compressed.

Use of the biasing member 76 in combination with the contact member 73 can reduce the initial force with which the contact member 73 contacts the arm activator C56 of the leg restraints on poultry cradle C10. That reduced initial force between contact member 73 and arm activator C56 may result in a reduced likelihood of binding in the leg restraints and, therefore, improve the repeatability of release of the legs of a bird retained in the poultry cradle C10.

In the depicted embodiment as seen in FIG. 16, plunger 77 extends through the biasing member 78 which is in the form of a coil spring. Other biasing members could be used in place of a coil spring 78 (e.g., pneumatic or hydraulic shock absorbers or struts, resilient elastomeric members, etc.).

Another optional feature depicted in connection with the illustrative embodiment of poultry cradle C10 and the illustrative embodiment of leg release apparatus is the misalignment of the leg release apparatus axis 71 along which the contact member 73 moves and the arm axis C53 along which the arm activator C56 moves to cause shank clamps of leg restraint to move to their open position as depicted in FIG. 13.

In one or more embodiments of the poultry cradle unloading systems described herein, a controller operably connected to the head release actuator of the head release apparatus and the leg release actuator may be configured to operate the head release actuator to move the head release apparatus 60 from the home position to the release position such that the head restraint C70 of the poultry cradle C10 in the unload location is moved from the closed configuration (see, for example, FIG. 6) to the release configuration (see, for example, FIG. 8) in which the head of a bird retained in the poultry cradle is no longer retained by the head restraint. The controller may also be configured to operate the leg release actuator to move the leg release apparatus 70 from the home position to the release position such that the leg restraint (for example, clamps C50) of the poultry cradle C10 in the unload location is moved from the closed configuration to the open configuration in which the legs of a bird retained in the clamps C50 the poultry cradle C10 are no longer retained by the leg restraint.

In one or more embodiments of the poultry cradle unloading systems described herein in which poultry cradles restraint both the head and legs of a bird the order in which the heads and legs of the birds are released from the poultry cradles at the unload location can be controlled. Control over the order in which the heads and legs of birds are released from the poultry cradles may promote safety for the birds by providing at least some control over the orientation of the released birds. In one or more embodiments, releasing the birds such that they are predisposed to landing in an upright orientation after release from a cradle may be particularly beneficial. In one or more embodiments of the poultry cradle unloading systems described herein, the unloading may involve releasing the head of the bird before releasing the legs of the bird.

To release or unload birds from the poultry cradles including both head restraints and leg restraints, in one or more embodiments, the controller is configured to operate the head release actuator before operating the leg release actuator such that the head of the bird is released from the head restraint before the legs are released from the leg restraint. Doing so may beneficially result in the bird being unloaded or released from the poultry cradle in a manner that results in the bird maintaining an upright orientation such that the bird is predisposed to landing on its legs and/or rear after unloading. As a part of that process, the controller may further be configured to operate the head release actuator and the leg release actuator such that the head restraint C70 is in its release configuration when the leg restraint (e.g., clamps C50) is moving from its closed configuration to its open configuration. As a result, the head restraint C70 may be described as being in its release configuration when the leg restraint (e.g., clamps C50) is in its open configuration.

In one or more embodiments, the controller may be configured to operate the head release actuator to move the head release apparatus 60 back to its home position (see FIG. 14) from its release position (see FIG. 15) after operating the head release actuator to move the head release apparatus 60 from the home position to the release position.

Yet another optional feature of one or more embodiments of a poultry cradle unloading system as described herein that can be described in connection with FIGS. 14-15 is the orientation of the birds retained in the poultry cradles C10 at least when the poultry cradles C10 are in the unload location of the poultry cradle unloading system.

While control over the order in which the heads and legs of birds are released from the poultry cradles may promote safety for the birds by providing at least some control over the orientation of the released birds, the poultry cradle and/or bird retained in the poultry cradle may be oriented to also improve safety in the unloading process. One preferred orientation for the poultry cradle which may be described as canted may be particularly beneficial in promoting safe unloading of birds when combined with controlling the order of release of the head and legs of a bird retained in a poultry cradle as described herein.

In one or more embodiments, the poultry cradle may be oriented at an angle (at least when in the unload location) such that the head of a bird retained in the poultry cradle is located forward of the hock joints of the bird (relative to a vertical axis defined by the direction of gravity). The hock joint is the joint found at the proximal ends of the shanks of a bird (where each shank of a bird contains the metatarsus and extends from the hock joint (sometimes referred to as the ankle joint) to the joints between the distal phalanges (sometimes referred to as the toes)).

With reference to the illustrative embodiment of poultry cradle C10 as depicted in FIG. 14, the poultry cradle C10 in the unload location can be described as being canted such that a ventral surface of a bird restrained in the poultry cradle C10 at the unload location faces downward. With respect to the poultry cradle C10 depicted in FIG. 14, the ventral surface of the bird rests against the cradle while the dorsal surface of the bird faces away from the poultry cradle C10. As a result, the ventral surface of a bird retained in the poultry cradle C10 faces downward towards the ground or floor on which the poultry cradle processing system is positioned (where downward is generally aligned with the direction of gravity).

Another manner in which the orientation of the poultry cradles at unload locations of poultry cradle unloading systems as described herein can be described is in terms of vertical axes extending through the head and hock joints of a bird retained in a poultry cradle at the unload location of a poultry cradle unloading system as described herein.

With reference to FIG. 14, the poultry cradle C10 is oriented such that a first vertical axis H (where vertical is defined by the direction of gravity) extending through the head of a bird restrained in the poultry cradle C10 (where the head of the bird is restrained in the head restraint C70) is offset in a horizontal direction from a second vertical axis HJ that extends between the hock joints of a bird restrained in the poultry cradle C10.

In one or more embodiments, a majority of a torso of a bird restrained in the poultry cradle C10 at the unload location may be described as being located between the first vertical axis H and the second vertical axis HJ. When used to describe the orientation of the poultry cradles at unload locations of poultry cradle unloading systems as described herein, the majority of the torso of a bird is based on the volume of the bird torso below the head and exclusive of all appendages such as legs, wings, etc.

In one or more embodiments, the horizontal offset distance between the first and second vertical axes H and HJ may be in the range of 2 cm or more, 3 cm or more, 4 cm or more, or 5 cm or more to properly orient a bird located within the poultry cradle C10 relative to the vertical direction. At the upper end, it may be preferred that the horizontal offset distance between the first vertical axis H and second vertical axis HJ may be in the range of 12 cm or less, 10 cm or less, or 8 cm or less.

One or more embodiments of the poultry cradle unloading systems described herein may include a delivery chute used to deliver birds released from poultry cradles in the unload location of the poultry cradle unloading systems to one or more selected locations. One illustrative embodiment of a delivery chute 40 is depicted in FIGS. 1-4 as well as FIGS. 17-21.

With reference to FIGS. 1-3 and 17-18, the selected location may be a delivery table 50 positioned below the unload location at which poultry cradles C10 are unloaded in the poultry cradle unloading systems described herein. The delivery table 50 may, in one or more embodiments include one or more selected locations to which the birds released are unloaded from poultry cradles C10 are delivered. In one or more embodiments, containers (for example, boxes, bins, bags, etc.) may be positioned at the selected locations to receive birds that are unloaded from poultry cradles C10 as described herein.

Figure 17:
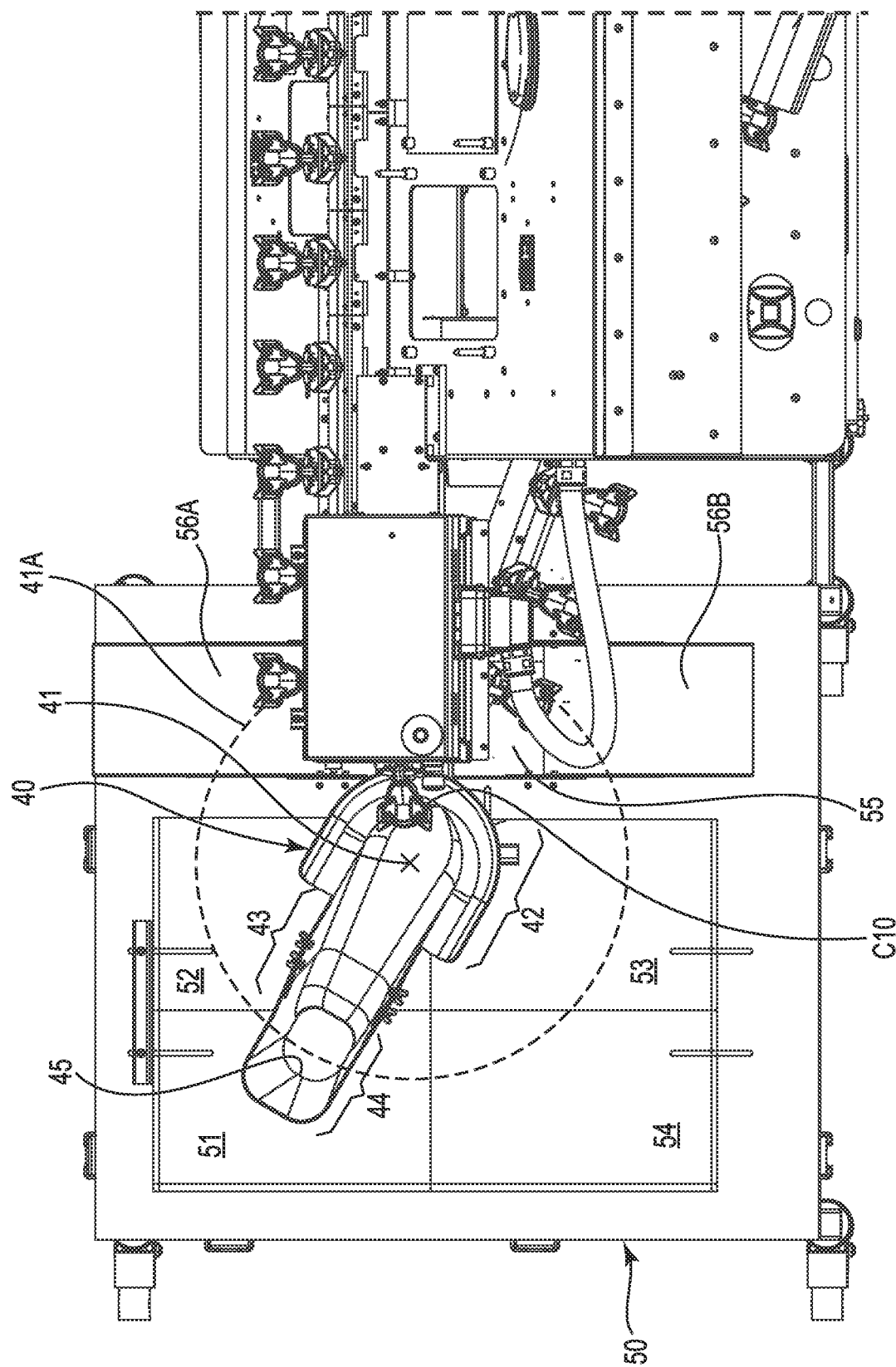
FIG. 17 is a top view of the poultry cradle unloading system of the poultry processing system of FIG. 1 with the shroud removed.
Figure 18:
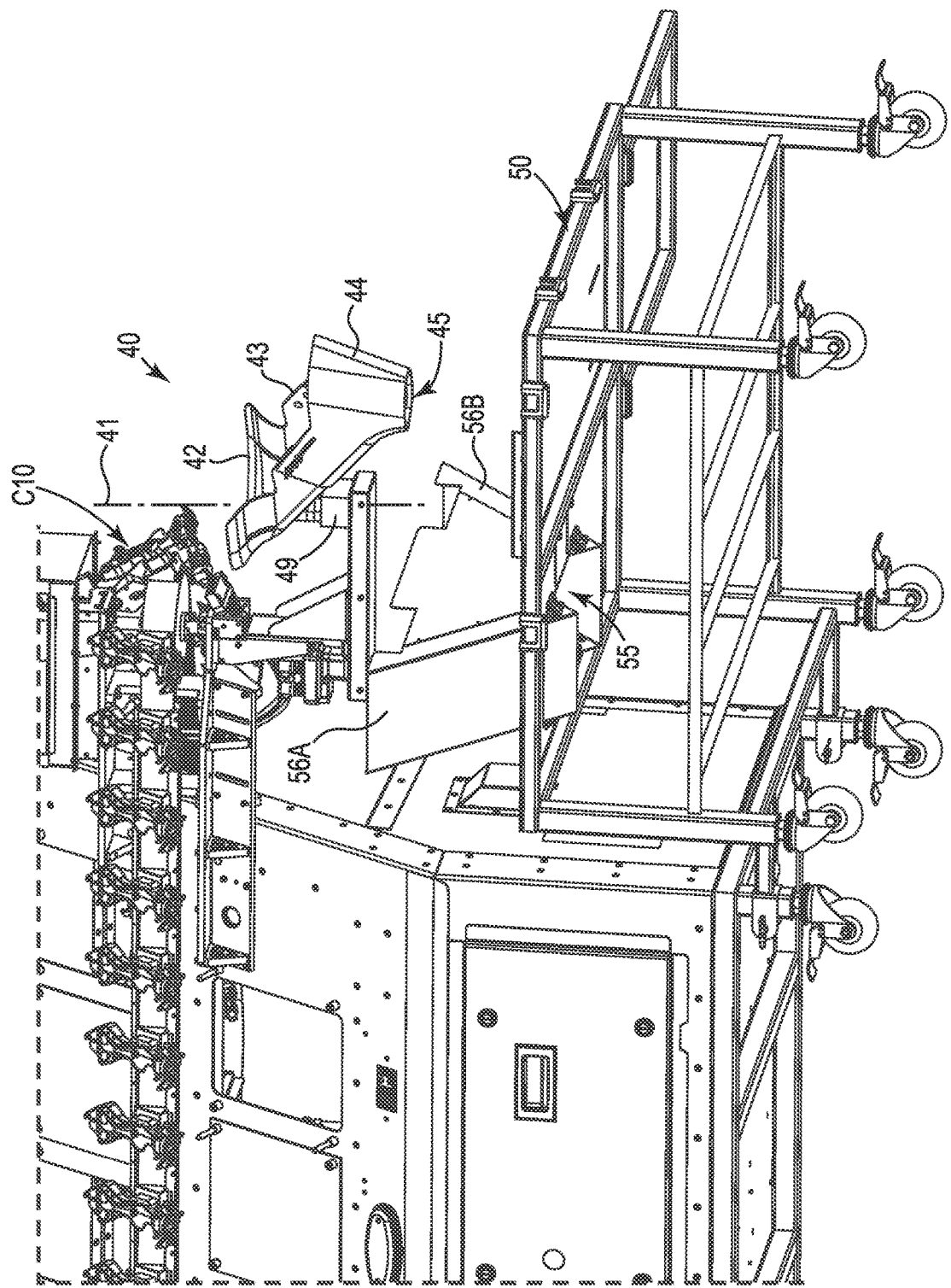
FIG. 18 is a bottom perspective view of the poultry cradle unloading system of the poultry processing system of FIG. 1.
Figure 19:
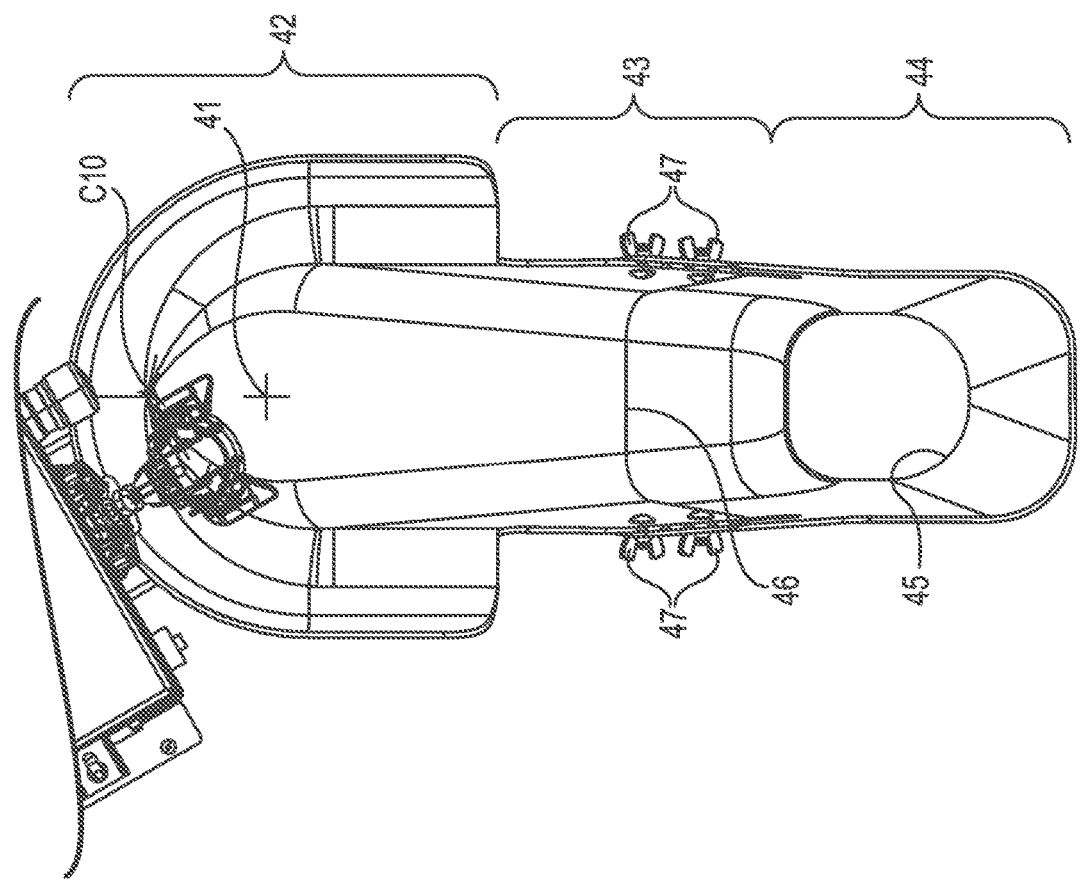
FIG. 19 is a top view of the delivery chute of the unload station as depicted in FIG. 1 with the shroud removed.

With reference to FIG. 17, one illustrative embodiment of a set of selected locations to which birds may be delivered may include selected locations 51, 52, 53, 54, and 55. In the depicted embodiment, selected locations 51-54 are located on the surface of the delivery table 50. Selected locations 51-54 may be spaced and oriented to receive containers positioned on the delivery table 50 such that birds released from the poultry cradle C10 are delivered to each of the containers at the selected locations 51-54.

While selected location 55 is, in the depicted illustrative embodiment, positioned to receive birds deposited on a pair of chutes 56A and 56B. Selected location 55 may include an opening through the delivery table 50 such that a container may be positioned below selected location 55 (and underneath the major surface of the delivery table 50) to receive birds delivered to the selected location 55 from chutes 56A and 56B.

Although the depicted illustrative embodiment includes a set of four selected locations 51-54 on delivery table 50 along with a fifth selected location 55, one or more alternative embodiments of poultry cradle unloading systems as described herein may include as few as one selected location, two selected locations, three selected locations, four selected locations, or 6 or more selected locations. In one or more embodiments of poultry cradle processing systems including a poultry cradle unloading system as described herein the fifth selected location may be used for birds that require further processing, manual inspection, or other actions before being deposited in a container at one of the selected locations used to identify birds that have been properly and/or fully processed in the poultry processing system including a poultry cradle unloading system as described herein.

Delivery of birds released or unloaded from poultry cradles C10 at an unload location of a poultry cradle unloading system as described herein is accomplished in the depicted illustrative embodiments of poultry cradle unloading systems by a delivery chute 40. The depicted illustrative embodiment of delivery chute 40 includes, with reference to FIGS. 20-21, a receiving tray 42 located below the unload location (and the poultry cradle C10 located at the unload location), a slide portion 43 that extends from the receiving tray 42 to a delivery end 44 located below the receiving tray 42.

Figure 20:
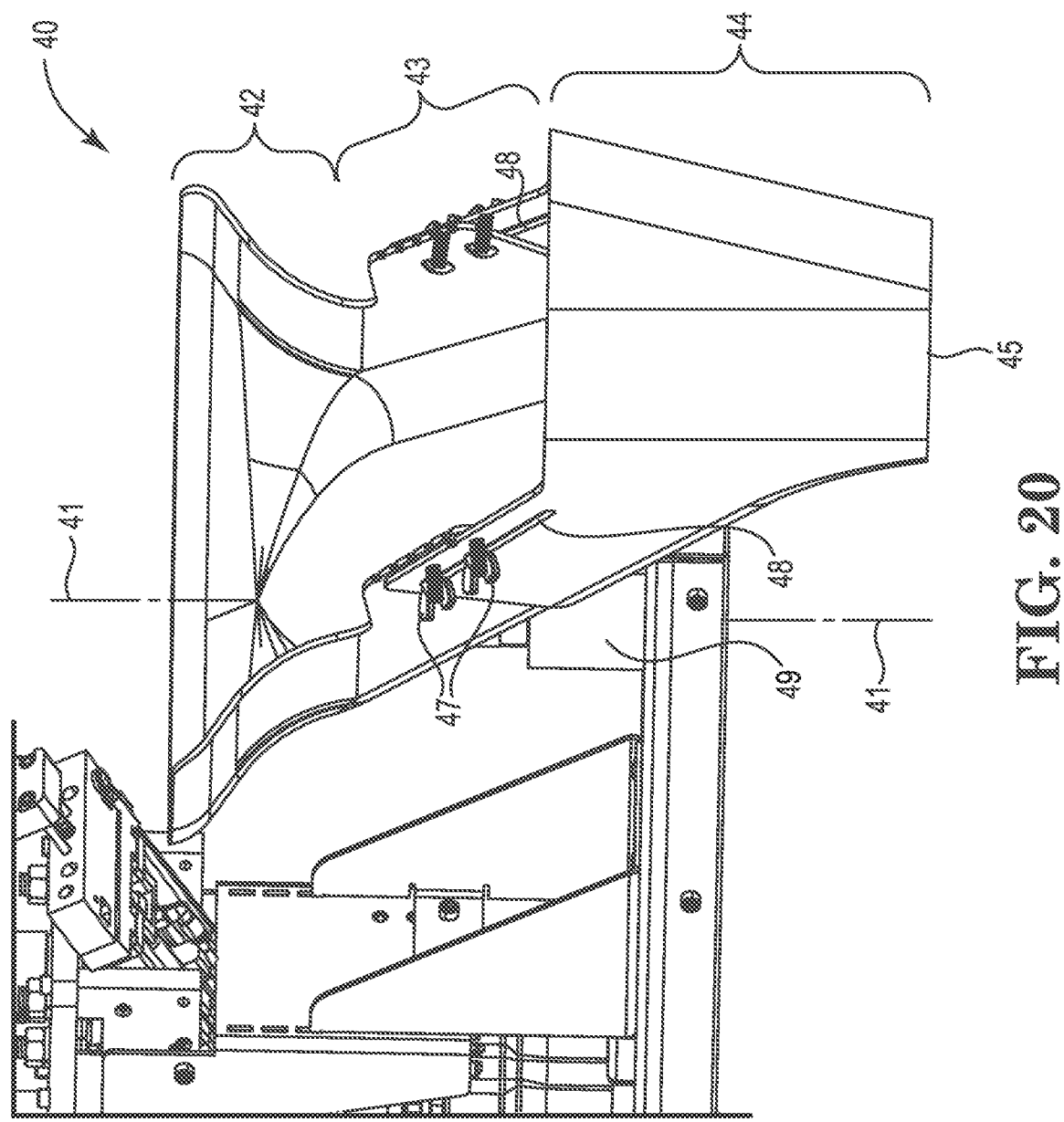
FIGS. 20-21 are enlarged views of the delivery chute depicted in FIG. 19.
Figure 21:
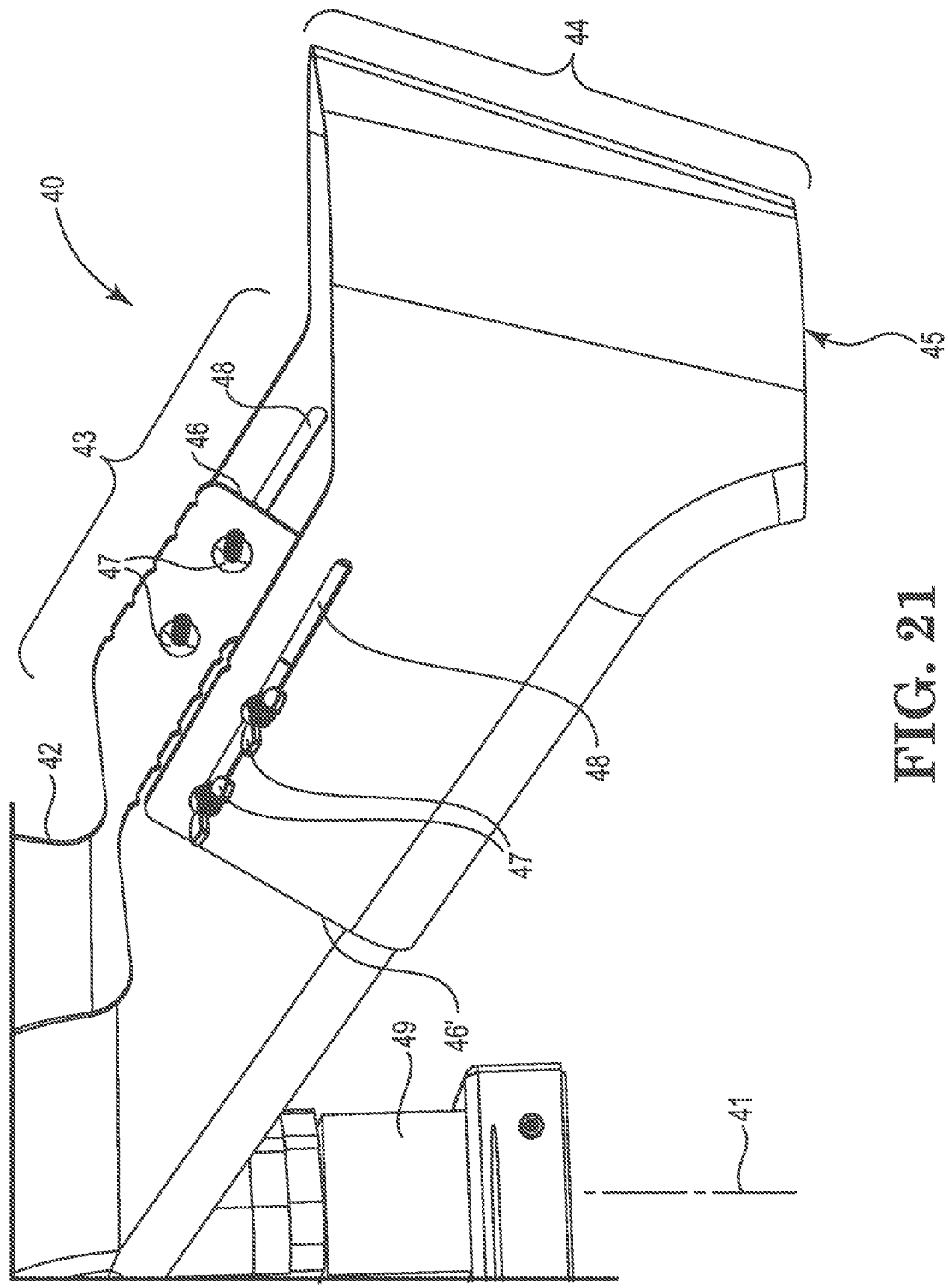

The receiving tray 42 of the depicted illustrative embodiment of delivery chute 40 is configured to receive a bird unloaded from a poultry cradle C10 at the unload location of the depicted illustrative embodiment of a poultry cradle unloading system described herein, while the slide portion is configured to deliver a bird received by the receiving tray 42 to the delivery end 44 of the delivery chute 40. Delivery end 44 includes a delivery opening 45 through which a bird passes when exiting the delivery chute 44 delivery to a selected location as described herein. Delivery end 44 may preferably be in the form of a funnel, one embodiment of which is depicted in FIGS. 20-21 to control delivery of the birds to the selected locations by directing birds delivered to the delivery chute through delivery opening 45.

In the depicted illustrative embodiment of the poultry cradle unloading system described herein, a chute actuator 49 is operably connected to the delivery chute 40, with the chute actuator 49 configured to rotate the delivery chute 40 about a chute axis 41. In the depicted illustrative embodiment, chute axis 41 extends through the receiving tray 42 of delivery chute 40. The chute actuator 49 may take a variety of forms configured to rotate the delivery chute 40 about chute axis 41. In one embodiment, the chute actuator 49 may take the form of a stepper motor, but examples of other potentially useful actuators include, but are not limited to, a piston/cylinder operated hydraulically, using a solenoid, etc., a motor with or without a gear assembly (e.g., a rack and pinion, etc.), magnetic/electromagnetic linear actuators, rotary actuators (e.g., pneumatic actuators, magnetic/electromagnetic actuators, etc.), etc.

The depicted illustrative embodiment of delivery chute 40 includes a telescoping slide portion 43 such that a slide distance between the receiving tray 42 and the delivery end 44 of the delivery chute can be adjusted between a minimum distance and a maximum distance. The telescoping slide portion of delivery chute 40 includes slots 48 along with fasteners 47. The depicted illustrative embodiment of delivery chute 40 includes an upper slide portion terminating at edge 46 and a lower slide portion terminating at edge 46'. The lower slide portion terminating at edge 46' contains, in the depicted illustrative embodiment, slots 48, while the upper slide portion terminating at edge 46 contains openings which receive fasteners 47 used to secure the telescoping slide portion 43 at a selected length.

Changing the slide distance between the receiving tray 42 and the delivery end 44 of a delivery chute of a poultry cradle unloading system as described herein can be used to facilitate accurate delivery of birds to one or more selected locations. For example, the height of a delivery table 50 relative to the unload location may change and that change may require adjustment of the slide distance of a delivery chute 40.

Rotation of the delivery chute of a poultry cradle unloading system provides for delivery of birds released or unloaded from poultry cradles at the unload location of the poultry cradle unloading systems described herein to one or more selected locations as described herein.

In the depicted illustrative embodiment, chute actuator 49 rotates the delivery chute 40 about chute axis 41 such that the delivery end 44 (and the delivery opening 45 located therein) is positioned above a selected location relative to the unload location of the poultry cradle unloading system. In one or more embodiments, the chute actuator 49 may rotate the delivery chute 40 such that a selected number of birds are delivered to each selected location in those systems in which a plurality of selected locations are provided. In one or more alternative embodiments, the chute actuator 49 may rotate the delivery chute such that birds are delivered to each selected location based on one or more processes that may have been performed or not performed on the birds in the poultry processing system of which the poultry cradle unloading systems described herein form a part. In other words, different birds may undergo a different set of processes such as beak treatment, claw treatment, injection, etc. in the poultry processing system and birds receiving different sets of processes may need to be separated from each other by delivering those birds to one or more selected locations based on their processing. In one or more alternative embodiments, different birds may be placed in different selected locations based on one or more physical characteristics (such as, e.g., weight, etc.), species (where different species are being processed at the same time), gender, etc.

Figure 22:
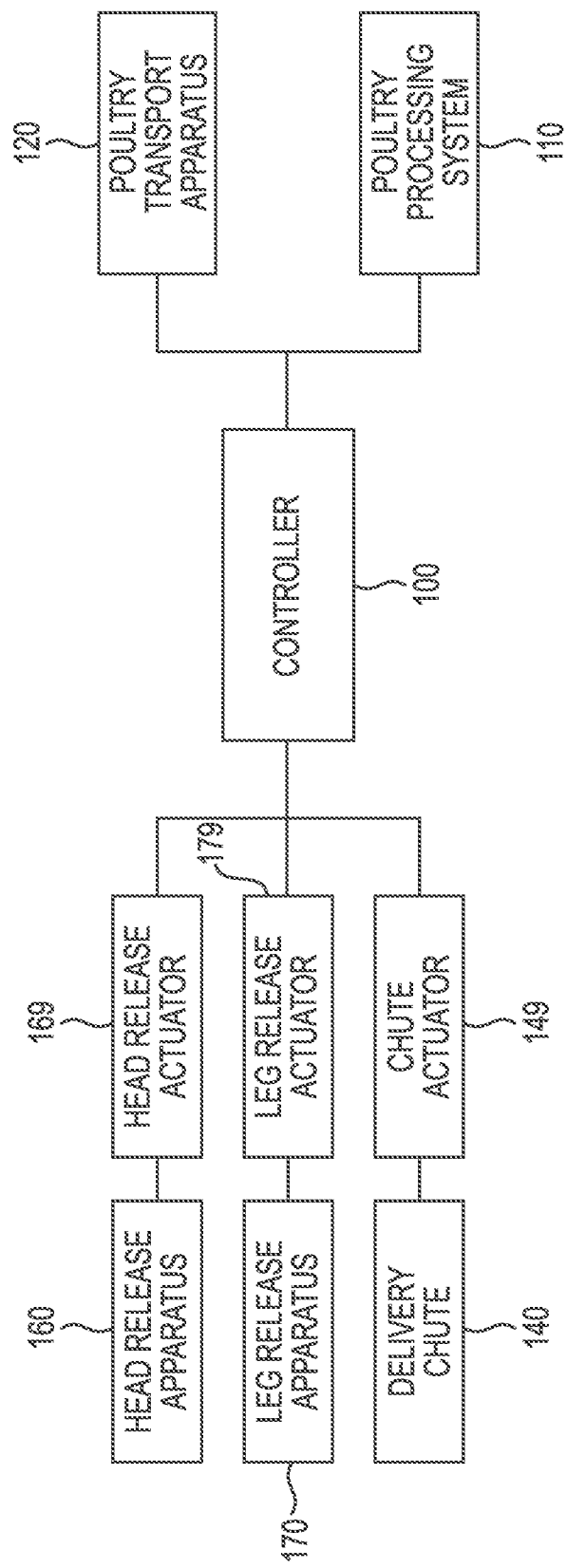
FIG. 22 is a schematic block diagram of components that may be found in one or more embodiments of the poultry cradle unloading systems as described herein.

FIG. 22 is a schematic diagram of components that may be found in one illustrative embodiment of a poultry cradle unload system as described herein. The depicted system includes a controller 100 operably connected to a head release actuator 169, a leg release actuator 179, and a chute actuator 149. In the depicted embodiment, the controller 100 is also operably connected to a poultry cradle transport apparatus 120 and to a poultry processing system 110 in which the poultry cradle unloading system is provided.

The head release actuator 169 is operably connected to a head release apparatus 160 of the poultry cradle unloading systems described herein. As described herein, the head release actuator 169 is used to move the head release apparatus between its home position and a release position, with the head release apparatus being configured to move the head restraint of a poultry cradle in the unload location from its closed configuration to a release configuration in which the head of a bird retained in the poultry cradle is no longer retained by the head restraint.

The leg release actuator 179 is operably connected to a leg release apparatus 170 of the poultry cradle unloading systems described herein. As described herein, the leg release actuator 179 is used to move the leg release apparatus between a home position and a release position, with the leg release apparatus being configured to move a leg restraint of a poultry cradle in the unload location from its closed configuration to an open configuration in which the legs of a bird retained in the poultry cradle are no longer retained by the leg restraint.

The chute actuator 149 is operably connected to a delivery chute 140 of a poultry cradle unloading system as described herein. The chute actuator 149 is used to rotate the delivery chute about a chute axis to facilitate delivery of birds to one or more selected locations as described herein.

The controller 100 may be provided in any suitable form and may, for example, include memory and a controller. The controller may, for example, be in the form of one or more microprocessors, Field-Programmable Gate Arrays (FPGA), Digital Signal Processors (DSP), microcontrollers, Application Specific Integrated Circuit (ASIC) state machines, etc. The controllers may include one or more of any suitable input devices configured to allow a user to operate the poultry toe and claw systems described herein (e.g., keyboards, touchscreens, mice, trackballs, etc.), as well as display devices configured to convey information to a user (e.g., monitors (which may or may not be touchscreens), indicator lights, etc.). Although not depicted separately, the controller 200 may incorporate a pneumatic and/or hydraulic control system in those systems in which one or more of the actuators use pneumatic and/or hydraulic components.

The illustrative embodiment of the poultry cradle unloading system depicted in FIG. 22 also includes a poultry cradle transport apparatus 120 operably connected to the controller. The controller 100 may be used to move poultry cradles into an out of an unload location of a poultry cradle unloading system as described herein.

Also depicted in FIG. 22 is a poultry processing system 110 that may also be operably connected to the controller 100. Connection of the poultry processing system 110 may be beneficial where, for example, information regarding the processing of individual birds carried in poultry cradles by the poultry cradle transport apparatus 120 is used to identify one or more of the selected locations to which the birds are to be delivered after they have been released or unloaded from a poultry cradle as described herein.

All references, applications, and publications cited herein are expressly incorporated herein by reference in their entirety into this disclosure, except to the extent they may directly contradict this disclosure. Although specific illustrative embodiments have been described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims.

What is claimed is:

1. A poultry cradle unloading system comprising:
  a plurality of poultry cradles, wherein each poultry cradle of the plurality of poultry cradles comprises a head restraint configured to retain a head of a bird retained in the poultry cradle when the head restraint is in a closed configuration and a leg restraint configured to retain legs of a bird retained in the poultry cradle when the leg restraint is in a closed configuration;
  a poultry cradle transport apparatus configured to move each poultry cradle of the plurality of poultry cradles to an unload location;
  a head release apparatus configured to move between a home position and a release position, wherein the head release apparatus is configured to move the head restraint of a poultry cradle in the unload location from the closed configuration to a release configuration in which the head of a bird retained in the poultry cradle is no longer retained by the head restraint when the head release apparatus moves from the home position to the release position;
  a leg release apparatus configured to move between a home position and a release position, wherein the leg release apparatus is configured to move the leg restraint of a poultry cradle in the unload location from the closed configuration to an open configuration in which the legs of a bird retained in the poultry cradle are no longer retained by the leg restraint when the leg release apparatus moves from the home position to the release position; and a controller operably connected to a head release actuator and a leg release actuator, wherein the controller is configured to:

operate the head release actuator to move the head release apparatus from the home position to the release position such that the head restraint of a poultry cradle in the unload location is moved from the closed configuration to the release configuration in which the head of a bird retained in the poultry cradle is no longer retained by the head restraint; and operate the leg release actuator to move the leg release apparatus from the home position to the release position such that the leg restraint of a poultry cradle in the unload location is moved from the closed configuration to the open configuration in which the legs of a bird retained in the poultry cradle are no longer retained by the leg restraint wherein the controller is configured to operate the head release actuator before operating the leg release actuator.

2. A system according to claim 1, wherein the controller is configured to operate the head release actuator and the leg restraint actuator such that the head restraint is in the release configuration when the leg restraint is moving from the closed configuration to the open configuration.

3. A system according to claim 2, wherein the head restraint is in the release configuration when the leg restraint is in the open configuration.

4. A system according to claim 1, wherein the controller is configured to operate the head release actuator to move the head release apparatus back to the home position from the release position after operating the head release actuator to move the head release apparatus from the home position to the release position.

5. A system according to claim 1, wherein the leg release apparatus comprises a dampened contact assembly configured to contact the leg restraint of a poultry cradle located in the unload location when leg release apparatus is moving into the open configuration.

6. A system according to claim 1, wherein each poultry cradle, when in the unload location, is canted such that a ventral surface of a bird restrained in a poultry cradle at the unload location faces downward.

7. A system according to claim 1, wherein each poultry cradle, when in the unload location, is canted such that a first vertical axis defined by gravity extending through the head of a bird restrained in a poultry cradle at the unload location is offset in a horizontal direction from a second vertical axis defined by gravity Extending between hock joints of a bird restrained in a poultry cradle.

8. A system according to claim 7, wherein a majority of a torso of a bird restrained in a poultry cradle at the unload location is located between the first vertical axis and the second vertical axis.

9. A system according to claim 1, wherein a head of a bird restrained in a poultry cradle at the unload location is located forward of hock joints of a bird restrained in a poultry cradle at the unload location.

10. A system according to claim 1, wherein the leg restraint of each poultry cradle of the plurality of poultry cradles comprises:

a shank clamp positioned to receive and atraumatically retain a shank of a bird restrained in the poultry cradle, wherein the shank clamp comprises an open configuration in which the shank can be positioned in the shank clamp and a closed configuration in which the shank is retained in the shank clamp; and a shank guide positioned between the shank clamp and the head restraint, the shank guide configured to restrain the shank of a bird restrained in the poultry cradle from movement in lateral and medial directions when the shank clamp is in the open configuration and the closed configuration.

11. A system according to claim 1, the system comprising a delivery chute comprising a receiving tray located below the unload location, the receiving tray configured to receive a bird released from a poultry cradle, wherein the delivery chute further comprises a slide portion extending from the receiving tray to a delivery end located below the receiving tray.

12. A system according to claim 11, wherein the slide portion comprises a telescoping slide portion, wherein a slide distance between the receiving tray and the delivery end is configured to be adjusted between a minimum distance and a maximum distance.

13. A system according to claim 11, wherein the system comprises a chute actuator operably connected to the delivery chute, the chute actuator configured to rotate the delivery chute about a chute axis extending through the receiving tray.

14. A system according to claim 13, wherein the chute actuator is operably connected to the controller, and wherein the controller is configured to operate the chute actuator to rotate the delivery chute about the chute axis such that the delivery end of the delivery chute is positioned above a selected location relative to the unload location.

15. A system according to claim 14, wherein the controller is configured to operate the chute actuator to rotate the delivery chute about the chute axis such that the delivery end of the delivery chute is positioned above the selected location before operating the leg release actuator to move the leg restraint from the home position to the release position.

16. A system according to claim 14, wherein the selected location comprises a first selected location of a plurality of selected locations located below the delivery chute.

17. A system according to claim 16, wherein the controller is configured to operate the chute actuator such that a selected number of birds are delivered to each selected location of the plurality of selected locations.

* * * * *